(12) United States Patent
Ohta et al.

(10) Patent No.: US 7,349,396 B2
(45) Date of Patent: Mar. 25, 2008

(54) CONTENT DISTRIBUTION SYSTEM

(75) Inventors: Yuusaku Ohta, Neyagawa (JP); Natsume Matsuzaki, Mino (JP); Hiroki Yamauchi, Ibaraki (JP); Yuichi Futa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 845 days.

(21) Appl. No.: 10/670,053

(22) Filed: Sep. 25, 2003

(65) Prior Publication Data
US 2004/0174824 A1 Sep. 9, 2004

(30) Foreign Application Priority Data

| Sep. 27, 2002 | (JP) | ............................. 2002-282626 |
| Oct. 10, 2002 | (JP) | ............................. 2002-297289 |
| Nov. 27, 2002 | (JP) | ............................. 2002-344022 |
| Mar. 20, 2003 | (JP) | ............................. 2003-078693 |

(51) Int. Cl.
*H04L 12/28* (2006.01)
(52) U.S. Cl. ...................... 370/392; 370/401; 370/486; 713/171; 713/182
(58) Field of Classification Search ................ 370/229, 370/230, 235, 236, 252, 253, 389, 392, 395.52, 370/401, 486; 713/160, 171, 182; 709/225, 709/232; 726/2–7, 12, 14, 17, 21, 26–33
See application file for complete search history.

(56) References Cited

U.S. PATENT DOCUMENTS

| 6,192,404 | B1 * | 2/2001 | Hurst et al. ................... 709/224 |
| 6,959,333 | B2 * | 10/2005 | Beaumont et al. ........... 709/223 |
| 2003/0009594 | A1 | 1/2003 | McElligott | |
| 2003/0048793 | A1 * | 3/2003 | Pochon et al. ............... 370/401 |
| 2003/0105956 | A1 * | 6/2003 | Ishiguro et al. ............. 713/158 |
| 2003/0108205 | A1 * | 6/2003 | Joyner et al. ................ 380/277 |
| 2003/0123438 | A1 * | 7/2003 | Li et al. ...................... 370/356 |
| 2003/0161476 | A1 * | 8/2003 | Fransdonk ................... 380/282 |
| 2003/0231629 | A1 * | 12/2003 | Banerjee et al. ............. 370/390 |

(Continued)

FOREIGN PATENT DOCUMENTS

GB 2 362 062 11/2001

(Continued)

OTHER PUBLICATIONS

Copending Application of Hiroki Yamauchi et al., U.S. Appl. No. 10/649,624, filed Aug. 28, 2003, entitled "Content-Duplication Management System, Apparatus and Method, Playback Apparatus and Method, and Computer Program".

Copending Application of Natsume Matsuzaki et al., U.S. Appl. No. 10/649,678, filed Aug. 28, 2003, entitled "Group Formation/Management System, Group Management Device, and Member Device".

(Continued)

*Primary Examiner*—Ricky Q. Ngo
*Assistant Examiner*—Gary Mui
(74) *Attorney, Agent, or Firm*—Wenderoth, Lind & Ponack, L.L.P.

(57) ABSTRACT

A content distribution system in which content transmission/reception is suppressed when there is a high risk of contents being stolen by a third party during communication. A content server acquires a communication distance indicating how far the content server is from a terminal in data communication. The content server conducts content transmission/reception when the communication distance is less than or equal to a predetermined value, and suppresses content transmission/reception when the communication distance exceeds the predetermined value.

10 Claims, 26 Drawing Sheets

U.S. PATENT DOCUMENTS

| | | | |
|---|---|---|---|
| 2003/0233540 A1* | 12/2003 | Banerjee et al. | 713/153 |
| 2004/0098579 A1* | 5/2004 | Nakano et al. | 713/150 |
| 2004/0122975 A1 | 6/2004 | Lennestal et al. | |
| 2004/0156384 A1* | 8/2004 | Rune et al. | 370/432 |
| 2005/0198662 A1* | 9/2005 | Endo et al. | 725/31 |

FOREIGN PATENT DOCUMENTS

| | | |
|---|---|---|
| JP | 10-271154 | 10/1998 |
| JP | 2001-285284 | 10/2001 |
| WO | 01/57696 | 8/2001 |
| WO | 02/067499 | 8/2002 |

OTHER PUBLICATIONS

Copending Application of Yuusaku Ohta et al., U.S. Appl. No. 10/649,890, filed Aug. 28, 2003, entitled "Content Duplication Management System and Networked Apparatus".

Copending Application of Yuusaku Ohta et al., U.S. Appl. No. 10/649,623, filed Aug. 28, 2003, entitled "Key Delivery Apparatus, Terminal Apparatus, Recording Medium, and Key Delivery System".

Copending Application of Yuichi Futa et al., Serial No. New, filed Sep. 25, 2003, entitled "Group Judgment Device".

U. Leonhardt, "Location Service in Mobile Computing Environments", 1996, Computers and Graphics, Pergamon Press Ltd. Oxford, GB, vol. 20, No. 5, pp. 627-632.

* cited by examiner

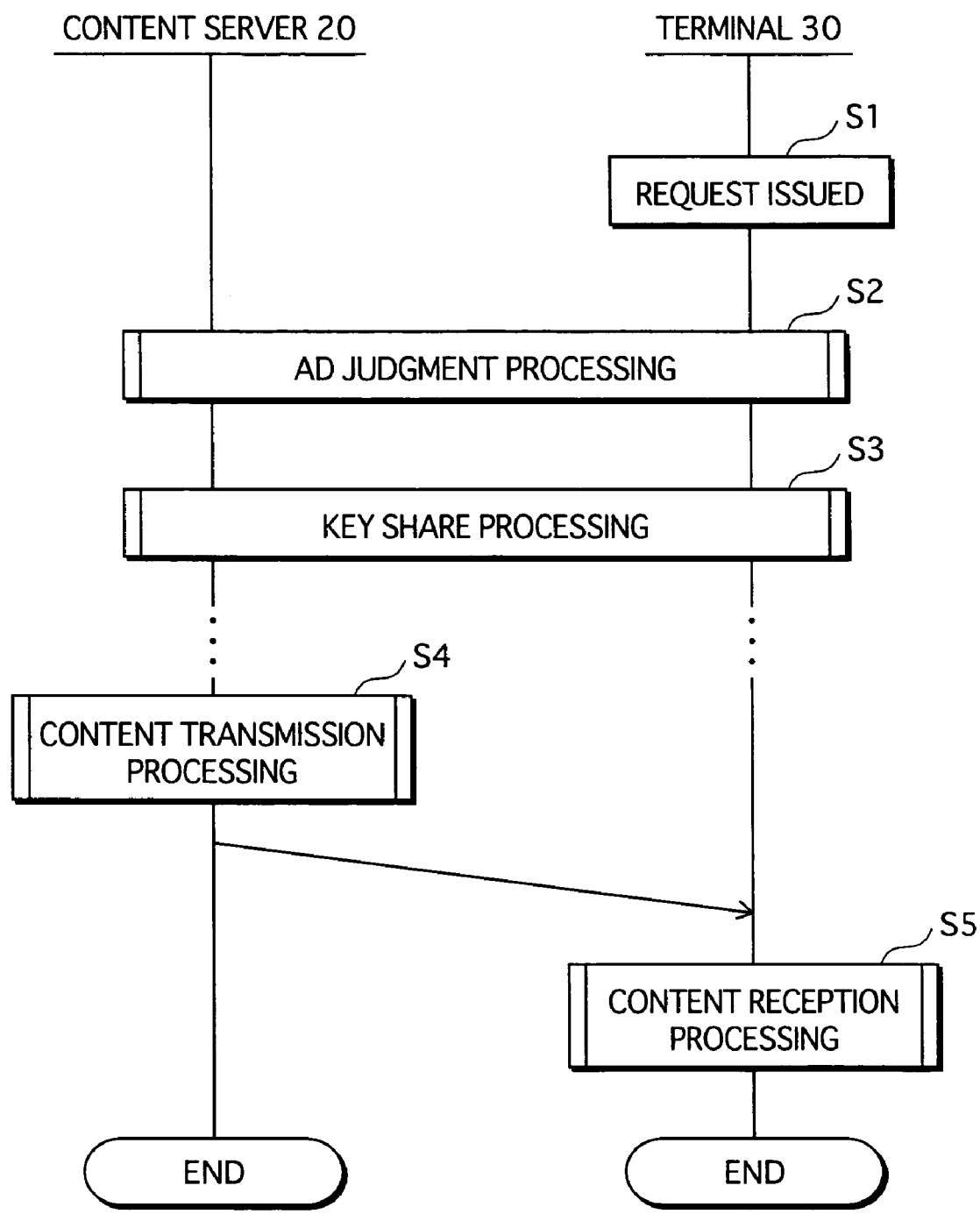

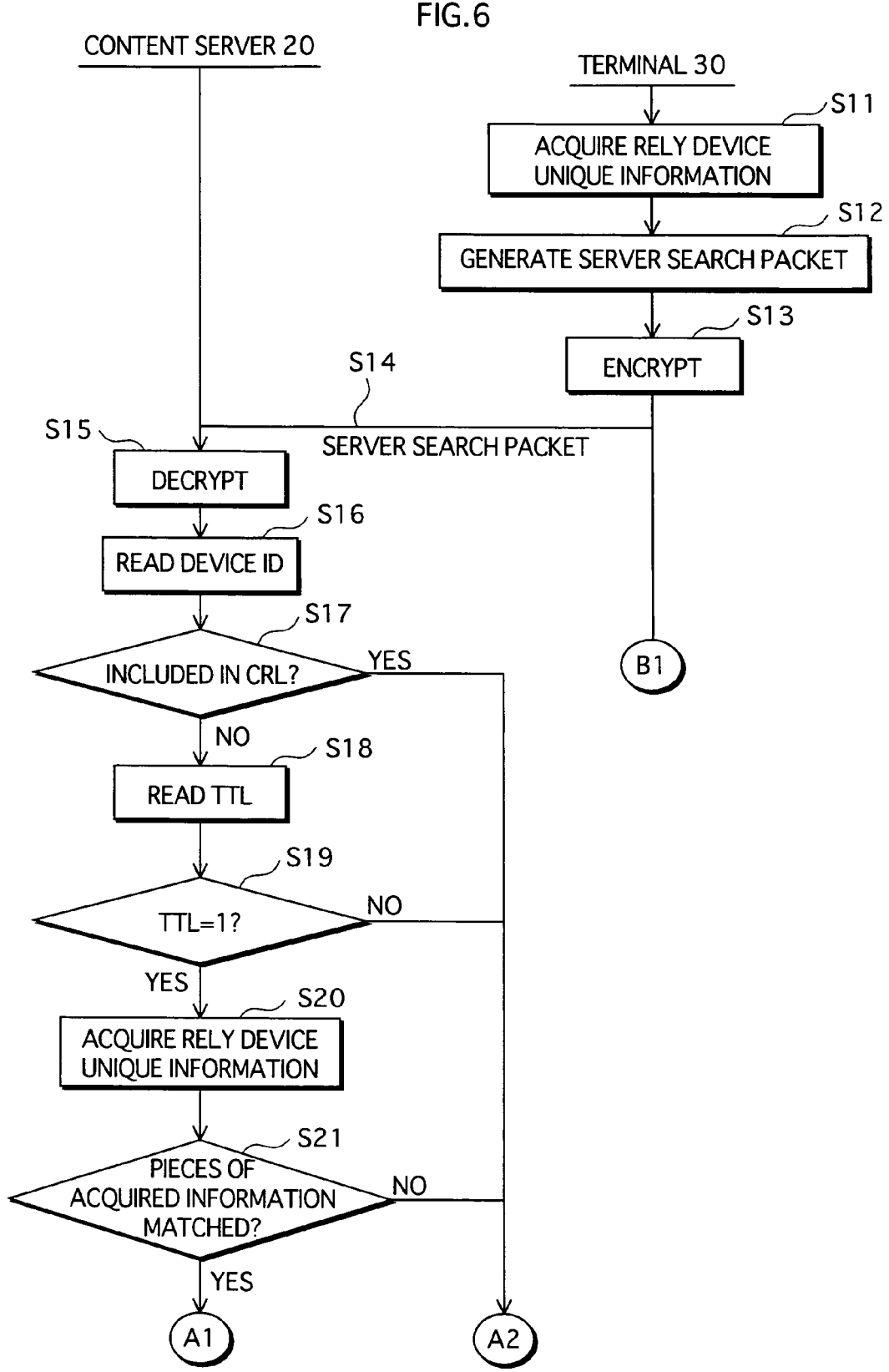

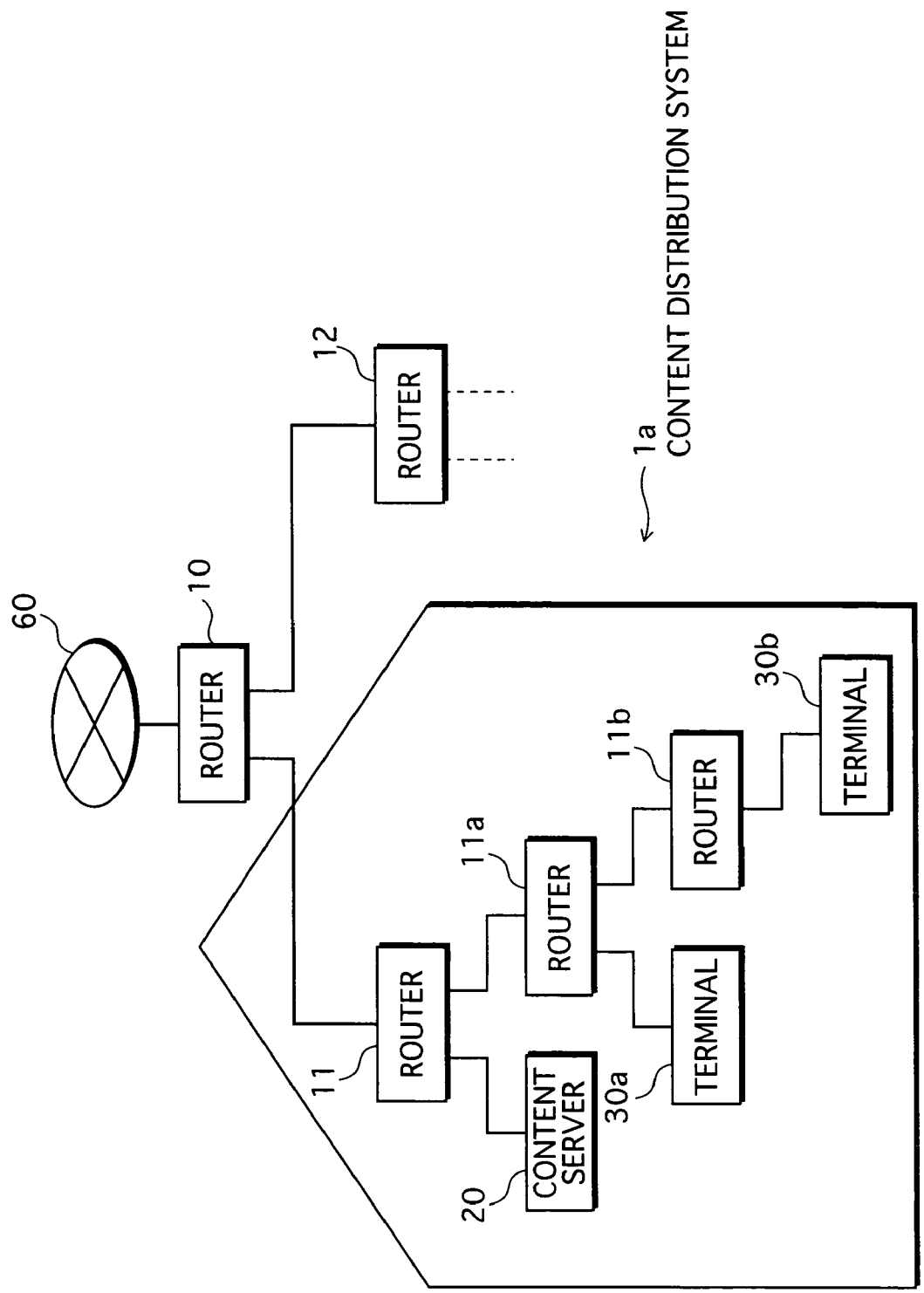

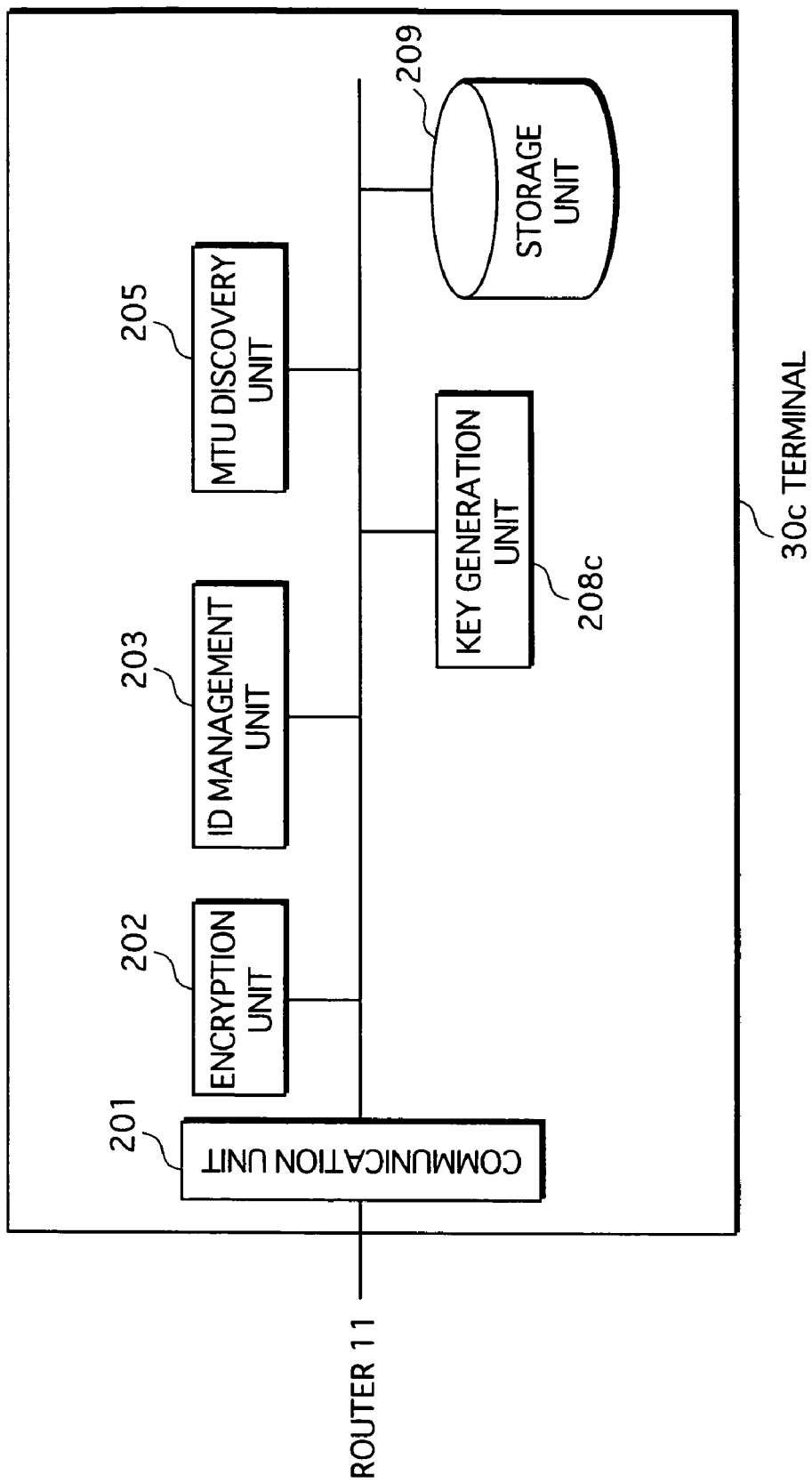

FIG.25

350 GROUP TABLE

| REQUEST ID | DEVICE ID |
|---|---|
| CID_0001 | ID_E |
| CID_0002 | ID_F |
| CID_0003 | ID_G |
| ... | ... |

CONTENT DISTRIBUTION SYSTEM

BACKGROUND OF THE INVENTION

1. Field of the Invention

The present invention relates to content distribution technology, particularly technology for determining terminals to which content distribution is permitted.

2. Related Art

In recent years an increasing number of home networks are being set up to share contents between terminals connected by a network in a home environment.

One possible configuration of this home network involves providing a single router in a home environment, and connecting a content server for storing contents and various terminals, such as DVD recorders, video players and so forth, below the router. The router is the only device in the home environment connected to an external network. The content server stores contents acquired from the external network via the router, and individual terminals request the content server for contents, which the content server then distributes in response to the requests.

However, unrestricted distribution of contents is not permissible in view of copyright protection. Restrictions are thus needed to prevent contents whose usage is only permitted of home terminals from being distributed to terminals outside of the home environment.

Unexamined Japanese patent application publication 2001-285284 discloses technology for performing authentication and key exchange prior to contents being transmitted/received when transmitting and receiving devices have the same subnet address.

According to this technology, contents can only be transferred between terminals having the same subnet address. Nevertheless, there are calls for technology that suppresses the transfer of contents in situations in which, for example, there is a high risk of contents being stolen by a third party, even during communication between terminals having the same subnet address.

SUMMARY OF THE INVENTION

In view of the demands for such technology, the present invention aims to provide a content distribution system in which content transmission/reception is suppressed when there is a high risk of contents being stolen by a third party during communication.

The object of the present invention is achieved by a communication device that includes: an acquiring unit operable to acquire a communication distance indicating how far the communication device is from another communication device in data communication; a distance judging unit operable to judge whether the acquired communication distance is less than or equal to a predetermined value; and a communication unit operable, when judged in the affirmative, to conduct content transmission/reception with the other communication device.

According to this structure, it is possible to transmit/receive contents or to suppress content transmission/reception, based on how far the communication device is from the other communication device in terms of data communication.

Here, the communication unit may conduct data communication with the other communication device prior to conducting the content transmission/reception, and the communication distance may indicate how many relay devices data transmitted by the other communication device passed through before reaching the communication device.

According to this structure, it is possible to transmit/receive contents or to suppress content transmission/reception, based on the number of relay devices that data passes through from the other communication device.

Here, the communication distance may indicate how many routers, as the relay devices, the data passed through from the other communication device to the communication device.

According to this structure, it is possible to transmit/receive contents or to suppress content transmission/reception, based on the number of routers that data passes through from the other communication device.

Here, the communication unit may conduct the data communication in a packet format that includes a time-to-live whose value decreases by "1" for every router passed through, and the acquiring unit may use the time-to-live in acquiring the communication distance.

According to this structure, the present invention can be implemented using an existing communication protocol, by using a time-to-live (TTL) set in a TTL field of an Internet Protocol (IP) packet to acquire the number of routers that data passes through.

Here, the communication device may further include: a key sharing unit operable to share key information with the other communication device; and an encryption unit operable, using the shared key information, to encrypt contents and decrypt encrypted contents, and the communication unit may transmit/receive encrypted contents.

According to this structure, content transmission/reception between communication devices can be conducted securely using key information shared between the communication devices.

Here, each packet received from the other communication device may include first identification information that uniquely identifies a router to which the other communication device is connected, and the communication device may further include: a router-information acquiring unit operable to acquire second identification information that uniquely identifies a router to which the communication device is connected; an ID judging unit operable to judge whether the first identification information matches the second identification information; and a suppressing unit operable, if judged in the negative, to suppress the content transmission/reception by the communication unit.

According to this structure, it is possible to transmit contents between communication devices that are connected to the same relay device and to suppress the circulation of contents to other devices, based on identification information identifying relay devices to which communication devices are connected.

Here, a data size of each packet transmitted/received by the communication unit may be equal to a maximum transmission unit of a network to which the communication unit is connected, and transmission/reception of partial packets may be prohibited.

According to this structure, when the other communication device wants to send an IP packet to which a new IP header has been appended in order to set a TTL value different to the TTL value actually specified in the packet, the packet, which is already the same size as the MTU (maximum transmission unit), needs to be broken up for transmission. However, since transmission of partial packets is prohibited with this structure, such packets do not end up reaching the communication device.

Here, the time-to-live included in each packet received from the other communication device may be set to a predetermined value at the time of transmission, and the acquiring unit may read a value of the time-to-live from the received packet, and acquire the communication distance based on the difference between the read value and the predetermined value of the time-to-live.

According to this structure, advance notification of a predetermined TTL is given to the other communication device, thus allowing the number of routers that data passes through to be easily obtained by reading the TTL included in received packets.

Here, the predetermined value of the time-to-live may be "1".

Since a packet having a TTL set to "1" is transmitted according to this structure, the communication device knows, on receipt of the packet, that the packet has not passed through any routers in other networks.

Here, at least part of each packet received/transmitted by the communication unit may be encrypted, and the encryption unit may output each received packet to the acquiring unit after decrypting the encrypted part of the packet, and output each packet for transmission to the communication unit after encrypting at least part of the packet.

Since at least a part of each packet containing data used in the judgment is encrypted, it is possible, according to this structure, to transmit/received data securely.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings:

FIG. 5 is a flowchart showing the overall operations performed in content distribution system 1;

FIG. 6 is a flowchart of AD-judgment processing performed in content distribution system 1 (cont.

FIG. 7 is a flowchart of AD-judgment processing performed in content distribution system 1 (cont. from FIG. 6);

FIG. 10 shows a structure of a content distribution system 1a;

FIG. 13 is a flowchart showing the overall operations performed in content distribution system 1a;

FIG. 14 is a flowchart of TTL-search processing performed in content distribution system 1a;

FIG. 16 is a flowchart of AD-judgment processing performed in content distribution system 1a (cont. from FIG. 15);

FIG. 19 is a functional block diagram showing a functional structure of a terminal 30c;

FIG. 24 is a functional block diagram showing a functional structure of a content server 20a;

FIG. 25 shows a data structure of a group table 350;

DETAILED DESCRIPTION OF THE PREFERRED EMBODIMENTS

Embodiments of the present invention are described in detail below.

Embodiment 1

A content distribution system 1 will now be described as an embodiment 1 of the present invention, with reference to the drawings. In content distribution system 1 (hereinafter "system 1"), contents are transferred between devices within a permitted range of content usage. This range is referred to below as an authorized domain ("AD"). Here, the authorized domain is envisaged, in particular, to be a home network in which devices in a home environment are connected to one another.

Structure

Figure 1:
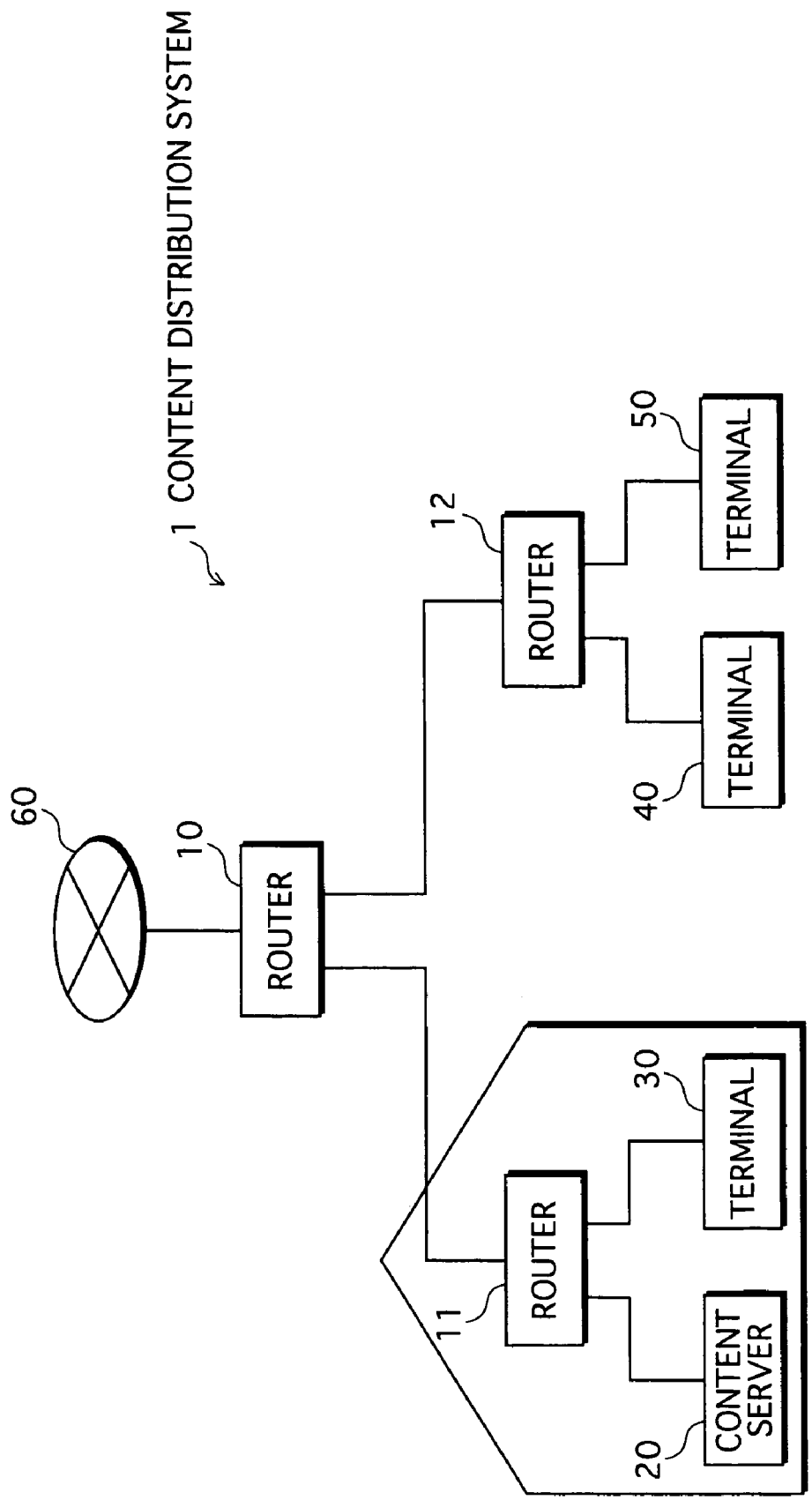
FIG. 1 shows a structure of a content distribution system 1.

FIG. 1 shows a structure of system 1. As shown FIG. 1, system 1 is constituted from routers 10, 11 and 12, a content server 20, and terminals 30, 40 and 50.

Routers 11 and 12 are connected to router 10, which is in turn connected to the Internet 60. Router 11 is a relay device within the authorized domain (i.e. an "in-AD" relay device), while router 12 is a relay device external to the authorized domain (i.e. an "out-AD" relay device). Content server 20 and terminal 30 are connected to router 11, while terminals 40 and 50 are connected to router 12.

In system 1, in-AD terminals are connected to a single router, and devices communicate using Internet Protocol Version 4 (IPv4) as a communication protocol.

1. Structure of Content Server 20

Content server 20 receives requests from other devices, and judges whether the devices are in-AD or out-AD devices. If a device is judged to be in-AD, content server 20 conducts key sharing with the device, and transmits contents encrypted using a shared key to the device.

Hereinafter, terminals judged to be in-AD devices are referred to as "in-group terminals" or "group members".

Figure 2:
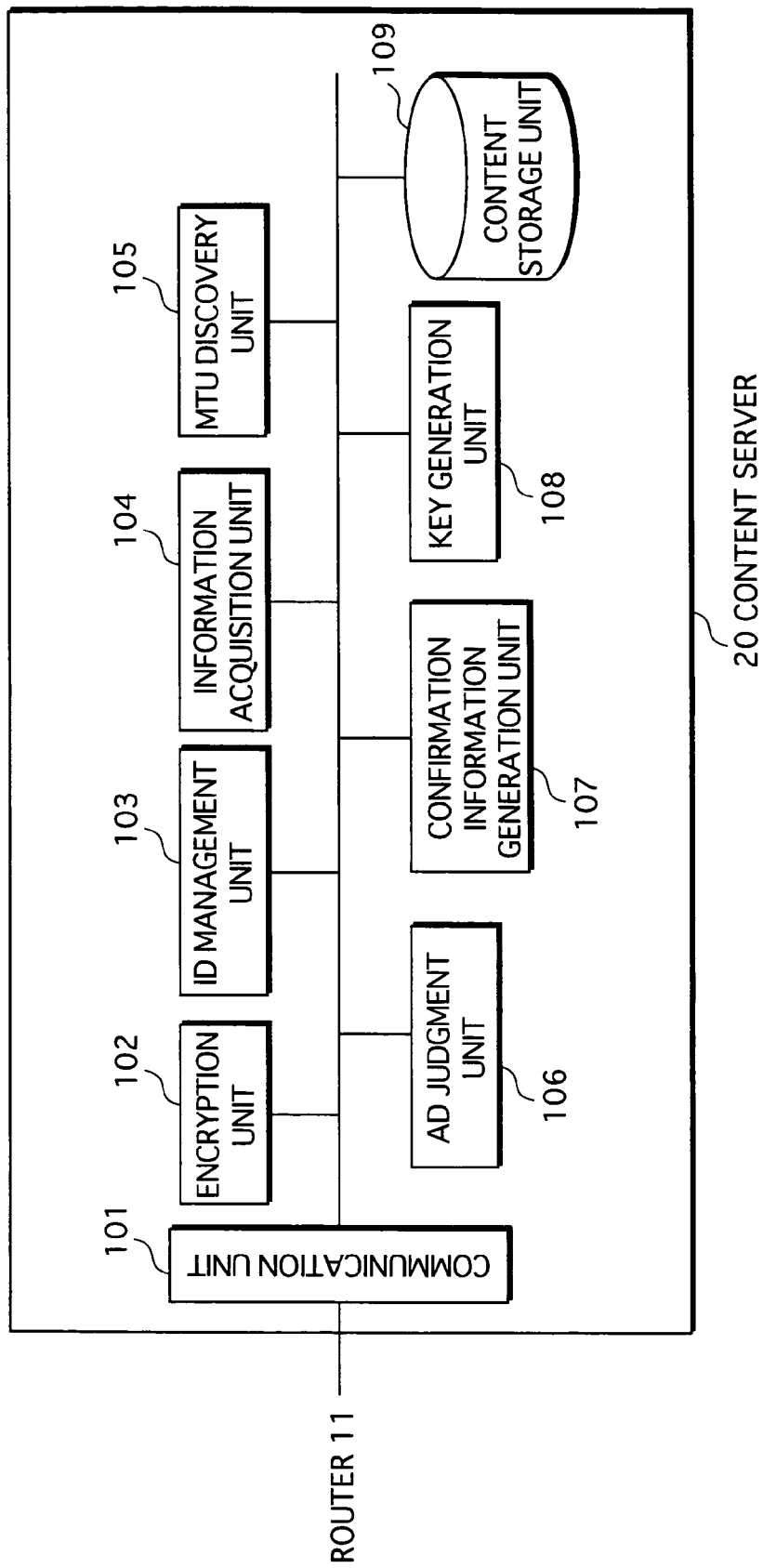
FIG. 2 is a functional block diagram showing a functional structure of a content server 20.

FIG. 2 is a functional block diagram showing a functional structure of content server 20. Content server 20 is constituted from a communication unit 101, an encryption unit 102, an ID management unit 103, an information acquisition unit 104, a maximum transmission unit (MTU) discovery unit 105, an AD-judgment unit 106, a confirmation-information generation unit 107, a key generation unit 108, and a content storage unit 109.

Content server 20 is specifically a computer system constituted from a microprocessor, a ROM, a RAM, a hard disk unit, a network connection unit, a display unit, a remote controller, and the like. Here, content server 20 is assumed to be a hard disk drive (HDD) recorder.

A computer program is stored in the RAM or on the hard disk unit, and content server 20 carries out functions as a result of the microprocessor operating in accordance with the computer program.

(1) Communication Unit 101

Communication unit 101 is a communication interface that communicates with other devices by transmitting/receiving Internet Protocol (IP) packets via router 11.

Figure 4A:
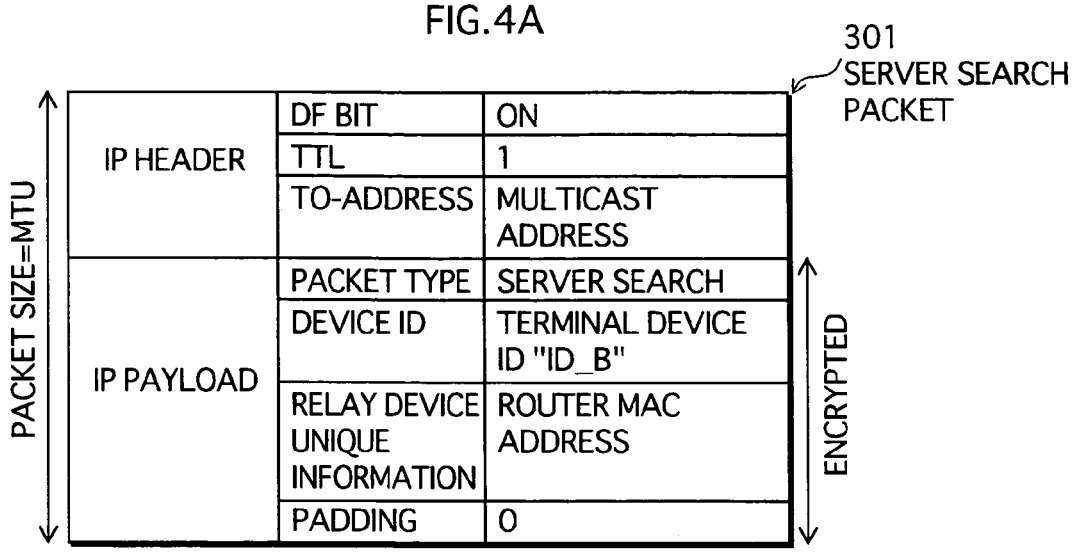
FIG. 4A shows a data structure of a server-search packet 301.
Figure 4B:
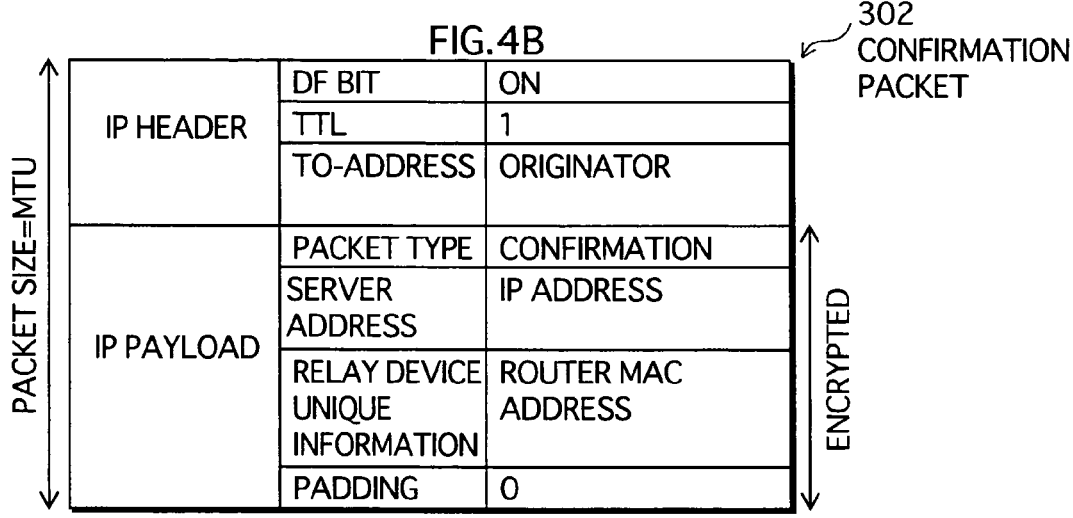
FIG. 4B shows a data structure of a confirmation packet 302.

Communication unit 101 sequentially receives transmission packets whose IP payloads have been encrypted by encryption unit 102, and outputs the packets to router 11. Confirmation packet 302 shown in FIG. 4B is an exemplary transmission packet. Unit 101 also receives transmission information that has been encrypted by unit 102, fragments the transmission information to generate transmission packets, and outputs the generated packets sequentially to router 11. Transmission information includes, for example, encrypted contents and the public key of content server 20. When generating packets from transmission information, unit 101 pads the packets so as to make each packet equal in size to a maximum transmission unit (MTU). Here, the MTU is information received from MTU discovery unit 105.

Figure 4C:
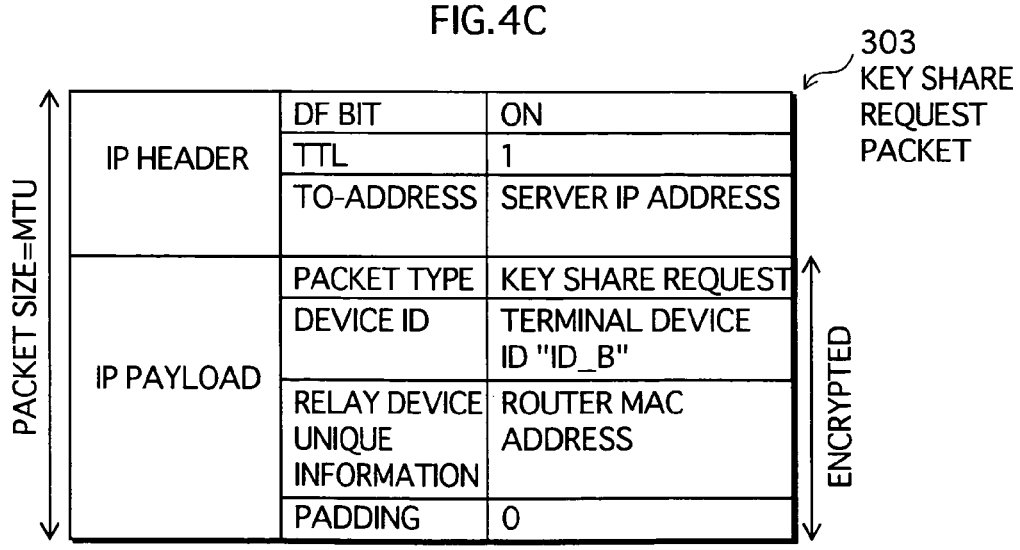
FIG. 4C shows a data structure of a key-share-request packet 303.

In addition, communication unit 101 receives packets having encrypted IP payloads sequentially from router 11, and outputs the packets sequentially to encryption unit 102. Server-search packet 301 and key-share-request packet 303 shown respectively in FIGS. 4A and 4C are exemplary packets received by communication unit 101. Unit 101 also accumulates packets having encrypted IP payloads received from router 11, generates reception information from the received packets, and outputs the generated reception information to unit 102. Exemplary reception information includes the public keys of terminals.

The data structures of server-search packet 301, confirmation packet 302 and key-share-request packet 303 are described in detail in a later section.

(2) Encryption Unit 102

Encryption unit 102 receives confirmation packets sequentially from confirmation-information generation unit 107, and outputs the received packets to communication unit 101 after encrypting the IP payloads. Unit 102 also receives a public key relating to content server 20 from key generation unit 108, encrypts the public key, and outputs the encrypted public key to communication unit 101.

In addition, encryption unit 102 receives server-search packets sequentially from communication unit 101, and outputs the received packets to AD-judgment unit 106 after decrypting the IP payloads. Unit 102 also receives key-share-request packets sequentially from communication unit 101, and outputs the received packets to AD-judgment unit 106 after decrypting the IP payloads.

Encryption and decryption algorithms used by encryption unit 102 are, as one example, Advanced Encryption Standard (AES) algorithms. Here, key information is shared in advance between devices that are to communicate, and stored in a tamper-resistant area. As the AES is defined by Federal Information Processing Standard (FIPS) 197, description is omitted here.

Furthermore, encryption unit 102 receives contents from content storage unit 109, and reads shared keys stored by key generation unit 108. Unit 102 encrypts received contents using shared keys to generate encrypted contents, and outputs the encrypted contents to communication unit 101. The encryption algorithm used by unit 102 is, as one example, an AES algorithm.

(3) ID Management Unit 103

ID management unit 103 stores a device ID "ID_A" used for uniquely identifying content server 20. Device ID "ID_A" is specifically 8-byte data unique to content server 20.

(4) Information Acquisition Unit 104

Information acquisition unit 104 acquires the Media Access Control (MAC) address of the router to which content server 20 is connected, and stores the acquired address in an internal storage area. Unit 104 may be structured to perform this processing when content server 20 is first connected to the router, or to acquire the MAC address periodically and overwrite the stored MAC address with the acquired MAC address.

One method of acquiring the MAC address is to use a protocol known as the Address Resolution Protocol (ARP). Since the ARP is described in Request For Comment (RFC) 825, description is omitted here.

(5) MTU Discovery Unit 105

MTU discovery unit 105 acquires the MTU of the network to which content server 20 is connected, and stores the acquired MTU in an internal storage area. Unit 105 may be structured to conduct the above processing only once when content server 20 is first connected to the network, or to acquire the MTU of the network periodically and overwrite the stored MTU with the acquired MTU.

Here, the MTU is acquired using the technique for discovering path MTUs described in RFC 1191.

(6) AD-judgment Unit 106

AD-judgment unit 106 receives requests for contents from other devices, and judges whether the other devices are in-AD devices.

AD-judgment unit 106 receives and stores a certification revocation list (CRL) from a certification authority via the Internet 60 when content server 20 is first connected to the network. A CRL is a list of the device IDs of invalidated devices, which are devices, for instance, whose secret key has been disclosed. Unit 106 receives the latest CRLs from the certification authority as they become available, and overwrites the stored CRL with the newly received CRL.

AD-judgment unit 106 performs the following three processing operations (judgments 1-3) when either a server-search packet or a key-share-request packet is received from encryption unit 102.

Judgment 1: AD-judgment unit 106 reads the device ID from the received packet (i.e. server-search packet or key-share-request packet), and judges whether or not the read device ID is listed in the stored CRL; that is, whether or not the originator (i.e. transmission-source terminal) has been invalidated.

Judgment 2: AD-judgment unit 106 then reads a time-to-live (TTL) from the received packet, and judges whether the read TTL is "1".

Judgment 3: AD-judgment unit 106 then reads the relay-device unique information from the received packet, reads the relay-device unique information stored in information-acquisition unit 104, and judges whether the two pieces of relay-device unique information match.

If the above three judgments are all affirmative in the case of the received packet being a server-search packet, AD-judgment unit 106 outputs an instruction to confirmation-information generation unit 107 to generate a confirmation packet for transmitting to the originator of the server-search packet.

If the above three judgments are all affirmative in the case of the received packet being a key-share-request packet, AD-judgment unit 106 outputs an instruction to key-generation unit 108 to generate a shared key for sharing with the originator of the key-share-request packet.

Here, a TTL is a value showing how long a packet is allowed to remain active on a network. TTLs are provided so as to prevent packets from remaining active on a network in the case, for instance, of a router configuration error causing a packet to loop endlessly. More specifically, TTLs are counted using "hop counts". The originator sets a predetermined TTL in the TTL field of the IP header when sending a packet. One count is subtracted from the TTL each time the packet passes from one router (i.e. relay device) to the next. When the TTL reaches zero, the router that detects the zero count discards the packet (i.e. the packet is transferred no further).

(7) Confirmation-Information Generation Unit 107

Confirmation-information generation unit 107 generates confirmation packets as described below when instructed by AD-judgment unit 106. A confirmation packet is constituted from an IP header and an IP payload. The following description relates to exemplary confirmation packet 302 shown in FIG. 4B.

The IP header includes a don't fragment (DF) bit, a TTL, and a to-address. The DF bit is set to either "on" or "off". Fragmenting the packet for transmission is prohibited when the DF bit is set to "on" and permitted when set "off". As shown in FIG. 4B, confirmation-information generation unit 107 sets the DF bit to "on" (i.e. fragmentation prohibited), thus preventing the packet from being encapsulated. Unit 107 sets the TTL to "1", thus preventing the packet from being transmitted beyond router 11 to another network. Unit 107 sets the IP address of the originator of the server-search packet in the to-address. The originator's IP address may be stored by unit 107 in correspondence with the device ID of the originator or included in the packet sent by the originator and extracted from the packet by unit 107.

The IP payload includes packet type, server address, relay-device unique information and padding data. Confirmation-information generation unit 107 writes "confirmation" as the packet type so as to shows that the packet is a confirmation packet. Unit 107 writes the IP address of content server 20 as the server address. Unit 107 reads the router MAC address from information-acquisition unit 104, and writes the read MAC address as the relay-device unique information. Unit 107 writes padding data into the IP payload so as to make confirmation packet 302 the same data size as the MTU. The padding data in the given example has a zero value.

Confirmation-information generation unit 107 outputs the resultant confirmation packet 302 sequentially to encryption unit 102.

(8) Key-Generation Unit 108

An external management center provides key-generation unit 108 with an elliptic curve E: $y^2=x^3+ax+b$ and an origin G in advance.

Key-generation unit 108 performs shared-key generation processing as described below when instructed by AD-judgment unit 106 to generate a shared key with the originator of a key-share-request packet.

Key-generation unit 108 sets a secret key xA and calculates a public key YA using the following expression:

$$YA=xA*G$$

Key-generation unit 108 sends the public key YA to the originator, and receives the originator's public key YB from the originator.

Using the originator's public key YB and the secret key xA of content server 20, key-generation unit 108 calculates xA*YB to generate a shared key, and stores the shared key internally.

Once the shared key has been generated and stored, key-generation unit 108 instructs content storage unit 109 to read a content.

(9) Content Storage Unit 109

Content storage unit 109 is specifically a hard disk drive unit that stores contents internally. When instructed by key-generation unit 108, unit 109 outputs read contents to encryption unit 102.

2. Structure of Terminal 30

Terminal 30 is an in-AD device connected to router 11. Terminal 30 performs key-share processing with content server 20, and transmits/receives contents using a shared key.

Figure 3:
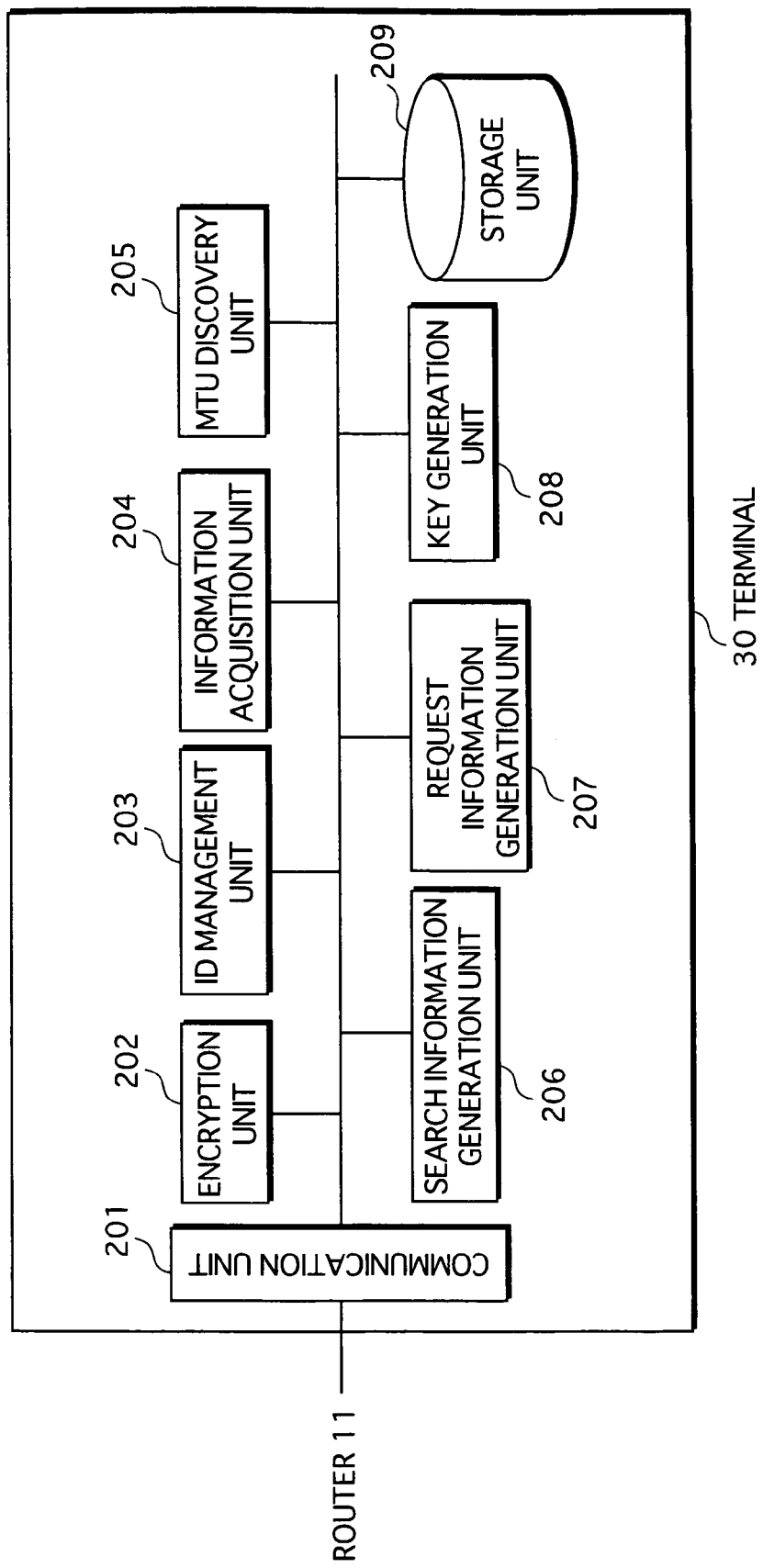
FIG. 3 is a functional block diagram showing a functional structure of a terminal 30.

FIG. 3 is a functional block diagram showing a functional structure of terminal 30. As shown in FIG. 3, terminal 30 is constituted from a communication unit 201, an encryption unit 202, an ID management unit 203, an information acquisition unit 204, a MTU discovery unit 205, a search-information generation unit 206, a request-information generation unit 207, a key generation unit 208, and a storage unit 209.

Terminal 30 is specifically constituted from a microprocessor, a ROM, a RAM, a hard disk unit, a network connection unit, a display unit, a remote controller, and the like. More specifically, terminal 30 is an audio-visual device, household electrical appliance or the like that is connectable to a network. A computer program is stored in the RAM or on the hard disk unit, and terminal 30 carries out functions as a result of the microprocessor operating in accordance with the computer program.

(1) Communication Unit 201

Communication unit 201 is a communication interface that communicates with other devices by transmitting/receiving Internet Protocol (IP) packets via router 11.

Communication unit 201 sequentially receives transmission packets whose IP payloads have been encrypted by encryption unit 202, and outputs the received packets to router 11. Server-search packet 301 and key-share-packet 303 shown respectively in FIGS. 4A and 4C are exemplary transmission packets. Unit 201 also receives transmission information that has been encrypted by unit 202, fragments the transmission information to generate transmission packets, and outputs the generated packets sequentially to router 11. Exemplary transmission information includes the public key of terminal 30. When generating packets from transmission information, unit 201 pads the packets so as to make each packet equal in size to the MTU. Here, the MTU is received from MTU discovery unit 205.

Furthermore, communication unit 201 sequentially receives packets having encrypted IP payloads from router 11, and outputs the packets sequentially to encryption unit 202. Confirmation packet 302 shown in FIG. 4B is an exemplary packet received by unit 201. Unit 201 also accumulates packets having encrypted IP payloads received from router 11, generates reception information from the received packets, and outputs the reception information to unit 202. Reception information includes, for example, encrypted contents.

(2) Encryption Unit 202

Encryption unit 202 has the same structure and function as encryption unit 102 in content server 20.

Encryption unit 202 receives server-search packets sequentially from search-information generation unit 206, and outputs the received packets to communication unit 201 after encrypting the IP payloads. Likewise, unit 202 receives key-share-request packets sequentially from request-information generation unit 207, and outputs the received packets to communication unit 201 after encrypting the IP payloads. Unit 202 also receives a public key relating to terminal 30 from key generation unit 208, encrypts the public key, and outputs the encrypted public key to communication unit 201.

In addition, encryption unit 202 receives confirmation packets sequentially from communication unit 201, and outputs the received packets to request information generation unit 207 after decrypting the IP payload.

Encryption and decryption algorithms used by encryption unit 202 are, as one example, Advanced Encryption Standard (AES) algorithms. Here, key information is shared in advance with content server 20, and stored in a tamper-resistant area.

Furthermore, encryption unit 202 receives encrypted contents from communication unit 201, and reads the shared key stored by key generation unit 208. Unit 202 decrypts encrypted contents using the read shared key to generate contents. Unit 202 stores generated contents in storage unit 209.

(3) ID Management Unit 203

ID management unit 203 stores a device ID "ID_B" used for uniquely identifying terminal 30. Device ID "ID_B" is specifically 8-byte data unique to terminal 30.

(4) Information Acquisition Unit 204

Information acquisition unit 204 acquires the Media Access Control (MAC) address of the router to which terminal 30 is connected, and stores the acquired address in an internal storage area. Unit 204 may be structured to perform this processing when terminal 30 is first connected to the router, or to acquire the MAC address periodically and overwrite the stored MAC address with the acquired MAC address. One method of acquiring the MAC address is to use the ARP.

(5) MTU Discovery Unit 205

MTU discovery unit 205 acquires the MTU of the network to which terminal 30 is connected, and stores the acquired MTU in an internal storage area. Unit 205 may be structured to conduct the above processing only once when terminal 30 is first connected to the network, or to acquire the MTU of the network periodically and overwrite the stored MTU with the acquired MTU.

Here, the MTU is acquired using the technique for discovering path MTUs described in RFC 1191.

(6) Search-Information Generation Unit 206

Search-information generation unit 206 generates a server-search packet as described below when a request issues A server-search packet is constituted from an IP header and an IP payload. The following description relates to exemplary server-search packet 301 shown in FIG. 4A.

The IP header includes a DF bit, a TTL, and a to-address. Search-information generation unit 206 sets the DF bit to "on" to prohibit fragmentation, sets the TTL to "1", and sets a multicast address in the to-address. Here, content server 20 notifies terminal 30 in advance of the TTL set by unit 206.

The IP payload includes packet type, device ID, relay-device unique information and padding data. Search-information generation unit 206 writes "server search" as the packet type so as to show that the packet is a server-search packet. Unit 206 reads "ID_B" from ID management unit 203, and writes the read "ID_B" as the device ID. Unit 206 reads the router MAC address from information-acquisition unit 204, and writes the read MAC address as the relay-device unique information. Unit 206 writes padding data into the IP payload so as to make server-search packet 301 the same data size as the MTU. The padding data in the given example has a zero value.

Search-information generation unit 206 outputs the resultant server-search packet 301 sequentially to encryption unit 202.

(7) Request-Information Generation Unit 207

Request-information generation unit 207 generates a key-share-request packet as described below when a confirmation packet is received from encryption unit 202. A key-share-request packet is constituted from an IP header and an IP payload. In the following example, key-share-request packet 303 (FIG. 4C) is generated on receipt of confirmation packet 302 (FIG. 4B) from unit 202.

The IP header includes a DF bit, a TTL, and a to-address. Request-information generation unit 207 sets the DF bit to "on", and sets the TTL to "1". Unit 207 reads the IP address of content server 20 from the IP payload of confirmation packet 302, and writes the read IP address as the to-address. Here, content server 20 notifies terminal 30 in advance of the TTL set by unit 207.

The IP payload includes packet type, device ID, relay-device unique information and padding data. Request-information generation unit 207 writes "key-share request" as the packet type so as to show that the packet is a key-share-request packet. Unit 207 reads "ID_B" from ID management unit 203, and writes the read "ID_B" as the device ID. Unit 207 reads the router MAC address from information-acquisition unit 204, and writes the read MAC address as the relay-device unique information. Unit 207 writes padding data into the IP payload so as to make server-search packet 301 the same data size as the MTU. The padding data in the given example has a zero value.

Request-information generation unit 207 outputs the resultant key-share-request packet 303 sequentially to encryption unit 202.

(8) Key-Generation Unit 208

The external management center provides key-generation unit 208 with the elliptic curve E and the origin G in advance.

Key-generation unit 208 performs shared-key generation processing as described below when a key-share-request packet generated by request-information generation unit 207 is transmitted to content server 20.

Key-generation unit 208 sets a secret key xB and calculates a public key YB using the following expression:

$$YB = xB * G$$

Key-generation unit 208 sends public key YB to content server 20, and receives public key YA of content server 20 from content server 20.

Using the received public key YA and the secret key xB of terminal 30, key-generation unit 208 calculates xB*YA to generate a shared key, and stores the shared key internally.

Here, the shared key xA*YB calculated by key-generation unit 108 in content server 20 can be transformed as follows:

$$xA*YB = (xA \times xB)*G$$

On the other hand, the shared key xB*YA calculated by key-generation unit 208 can be transformed as follows:

$$xB*YA = (xB \times xA)*G$$
$$= (xA \times xB)*G$$

This shows that the shared key xA*YB calculated by unit 108 is the same as the shared key xB*YA calculated by unit 208.

(9) Content Storage Unit 209

Content storage unit 209 is specifically a hard disk drive unit that receives encrypted contents from encryption unit 202, and stores the received contents.

3. Structures of Terminals 40 and 50

As shown in FIG. 1, terminals 40 and 50 are connected to router 12. These terminals are both constituted from a communication unit, an encryption unit, an ID management unit, an information acquisition unit, a MTU discovery unit, a search-information generation unit, a request-information generation unit, a key generation unit, and a storage unit.

The structures of terminals 40 and 50 are the same as terminal 30, as are the functions of the respective components. Functional block diagrams showing terminals 40 and 50 and descriptions of the various components have thus been omitted here.

Router 12 discards server-search packets transmitted by either terminal 40 or 50 whose TTL is set to "1", these packets failing to reach content server 20.

If terminal 40 or 50 sends a server-search packet having a TTL value "4", for example, this packet will reach content server 20. However, since content server 20 returns a confirmation packet having a TTL value "1" on receipt of a server-search packet, the confirmation packet will fail to reach the originator (i.e. terminal 40 or 50) of the server-search packet, thus preventing the originator from acquiring the IP address of content server 20. As such, the originator is unable to conducted key-share processing with content server 20.

Operations

The operations of content distribution system 1 are described below using the flowcharts shown in FIGS. 5 to 9.

(1) Overall Operations

Firstly, the overall operations of system 1 are described using the flowchart shown in FIG. 5.

When a request issues in terminal 30 (step S1), AD-judgment processing is performed between content server 20 and terminal 30 (step S2), followed by key-share processing (step S3). Content server 20 then performs content-transmission processing (step S4), and terminal 30 performs content-reception processing (step S5).

Since the operations of terminals 40 and 50 are the same as those of terminal 30, the FIG. 5 flowchart shows only the operations of content server 20 and terminal 30 so as to simplify the description.

(1) AD-judgment Processing

Figure 7:
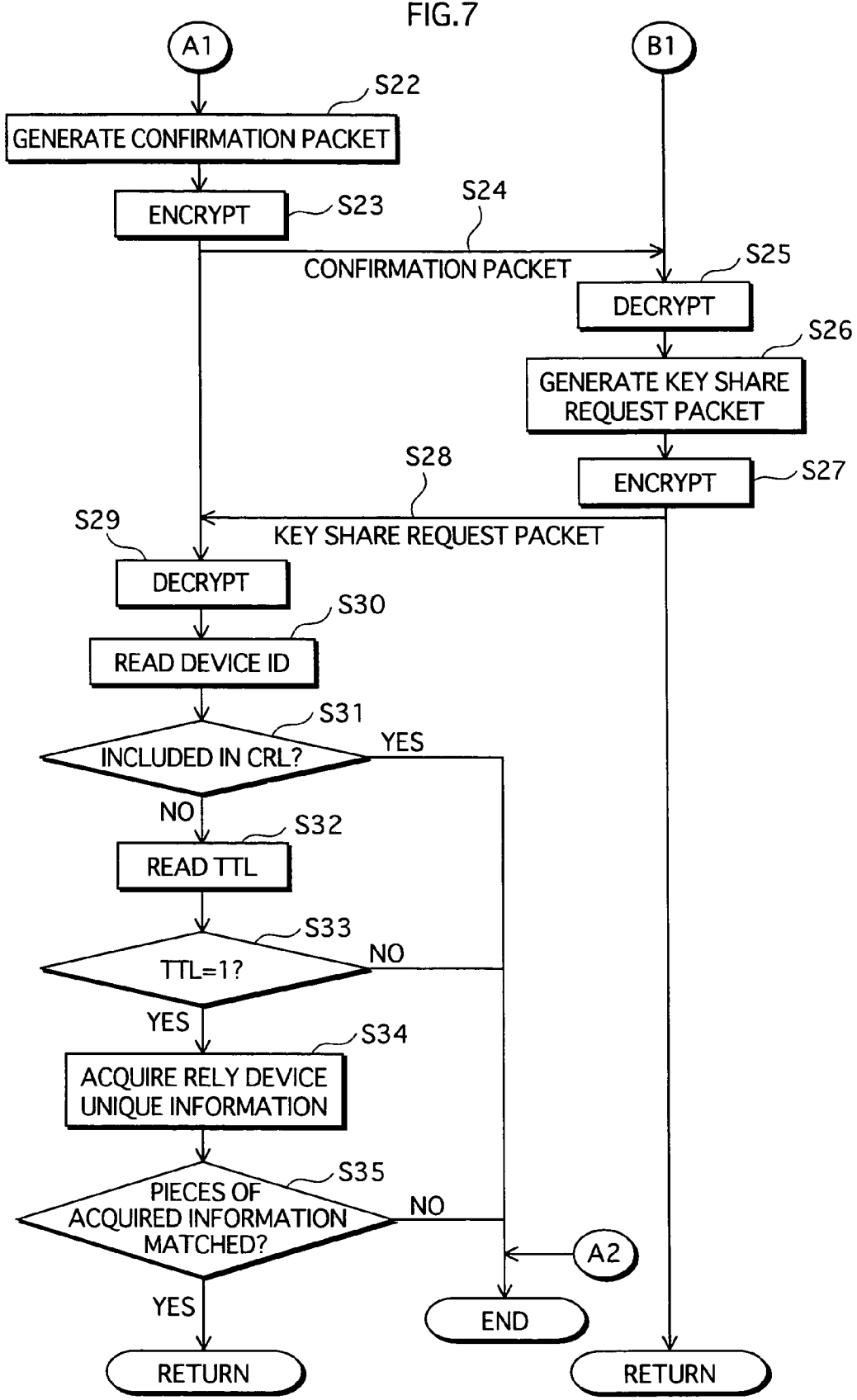
in FIG. 7)

AD-judgment processing is described below using the flowcharts shown in FIGS. 6 and 7. The processing described here expands on step S2 in FIG. 5.

Information-acquisition unit 204 in terminal 30 acquires the MAC address of the router to which terminal 30 is connected (step S11). Search-information generation unit 206 generates an MTU-sized server-search packet in which the TTL is set to "1" and the MAC address acquired at step S11 is written as the relay-device unique information (step S12). Unit 206 outputs the generated packet sequentially to encryption unit 202, and unit 202 receives the server-search packet and outputs the packet to communication unit 201 after encrypting the IP payload (step S13). Unit 201 multicast transmits the server-search packet (step S14).

Content server 20 receives the server-search packet transmitted by terminal 30 (step S14), and decrypts the encrypted payload using encryption unit 102 (step S15). AD-judgment unit 106 reads the device ID of the originator (terminal 30) included in the IP payload of the server-search packet (step S16), refers to the internally stored CRL, and judges whether the device ID of terminal 30 is listed in the CRL (step S17). If listed (step S17=YES), content server 20 ends the processing.

If judged that the device ID is not listed in the CRL (step S17=NO), AD-judgment unit 106 reads the TTL included in the IP header (step S18). If the TTL is not "1" (step S19=NO), content server 20 ends the processing.

If judged that the TTL is "1" (step S19=YES), AD-judgment unit 106 acquires the relay-device unique information included in the IP payload and the relay-device unique information stored by information-acquisition unit 104 (step S20), and judges whether the acquired pieces of information match (step S21). If not matched (step S21=NO), content server 20 ends the processing.

If judged that the acquired pieces of information match (step S21=YES), AD-judgment unit 106 instructs confirmation-information generation unit 107 to generate a confirmation packet, and unit 107 generates a confirmation packet in which the TTL is set to "1" and the IP address of content server 20 is included (step S22). Unit 107 outputs the generated packet to encryption unit 102, and unit 102 outputs the confirmation packet to communication unit 101 after encrypting the IP payload (step S23). Communication unit 101 transmits the confirmation packet to terminal 30, which receives the confirmation packet (step S24).

Encryption unit 202 in terminal 30 outputs the confirmation packet to request-information generation unit 207 after decrypting the IP payload (step S25). Unit 207 generates an MTU-sized key-share-request packet in which the IP address of content server 20 included in the IP payload of the confirmation packet is set as the to-address, the TTL is set to "1", and the MAC address acquired at step S11 is set as the relay-device unique information (step S26).

Request-information generation unit 207 outputs the generated packet to encryption unit 202, and unit 202 outputs the key-share-request packet to communication unit 201 after encrypting the IP payload (step S27). Communication unit 201 transmits the key-share-request packet to content server 20, which receives the key-share-request packet (step S28).

Encryption unit 102 in content server 20 outputs the key-share-request packet to AD-judgment unit 106 after decrypting the IP payload (step S29). Unit 106 reads the device ID of terminal 30 included in the IP header of the key-share-request packet (step S30), refers to the internally stored CRL, and judges whether the device ID is listed in the CRL (step S31). If listed (step S31=YES), content server 20 ends the processing.

If judged that the device ID is not listed in the CRL (step S31=NO), AD-judgment unit 106 reads the TTL included in the IP header (step S32). If the TTL is not "1" (step S33=NO), content server 20 ends the processing.

If the TTL is "1" (step S33=YES), AD-judgment unit 106 acquires the relay-device unique information included in the IP payload and the relay-device unique information stored in information-acquisition unit 204 (step S34), and judges whether the two pieces of information match (step S35). If not matched (step S35=NO), content server 20 ends the processing. If matched (step S35=YES), content server 20 and terminal 30 proceed to the step S3 processing in FIG. 5.

(3) Key-Share Processing

Key-share processing is described below using the flowchart shown in FIG. 8. This processing, which expands on step S3 in FIG. 5, is performed by key-generation unit 108 in content server 20 and key-generation unit 208 in terminal 30.

Content server 20 sets the secret key xA (step S41), and terminal 30 sets the secret key xB (step S42).

Content server 20 and terminal 30 both acquire the elliptic curve E: $y^2=x^3+ax+b$ and the origin G from the management center (steps S43, S44).

Content server 20 calculates the public key YA=xA*G (step S45) and transmits the calculated public key to terminal 30, which receives the transmitted public key (step S47).

Terminal 30, on the other hand, calculates the public key YB=xB*G (step S46) and transmits the calculated public key to content server 20, which receives the transmitted public key (step S48).

Content server 20 calculates the shared key xA*YB (step S49), and terminal 30 calculates the shared key xB*YA (step S50).

Here, the shared key calculated by content server 20 can be transformed as follows:

$$xA*YB=(xA \times xB)*G$$

On the other hand, the shared key calculated by terminal 30 can be transformed as follows:

$$xB*YA = (xB \times xA)*G$$
$$= (xA \times xB)*G$$

This shows that the shared keys calculated by content server 20 and terminal 30 are the same.

Key-generation unit 108 in content server 20 and key-generation unit 208 in terminal 30 store their respective shared keys internally. Next, content server 20 and terminal 30 proceed respectively to the steps S4 and S5 processing in FIG. 5.

(4) Content Transmission Processing

Content transmission processing is described below using the flowchart shown in FIG. 9A. This operation expands on step S4 in FIG. 5.

Content storage unit 109 reads a stored content when instructed by key-generation unit 108 (step S61), and outputs the read content to encryption unit 102. On receipt of the content, unit 102 reads shared key xA*YB from key-generation unit 108 (step S62).

Encryption unit 102 encrypts the content using shared key xA*YB to generate an encrypted content (step S63).

Communication unit 101 transmits the encrypted content to terminal 30 (step S64), and returns to the FIG. 5 flowchart.

(5) Content Reception Processing

Content reception processing is described below using the flowchart shown in FIG. 9B. This operation expands on step S5 in FIG. 5.

Communication unit 201 in terminal 30 receives an encrypted content from content server 20 (step S71), and outputs the encrypted content to encryption unit 202.

Encryption unit 202, on receipt of the encrypted content, reads shared key xB*YA stored in key-generation unit 208 (step S72).

Encryption unit 202 decrypts the encrypted content using shared key xB*YA as a decryption key, to generate a content (step S73). Unit 202 stores the generated content in storage unit 209 (step S74), and returns to the FIG. 5 flowchart.

Variation 1

A content distribution system 1a (hereinafter "system 1a") described below is a variation of content distribution system 1. In comparison to system 1, which includes a single router per authorized domain, all of the in-AD devices being connected to this router, system 1a includes a plurality of routers per authorized domain, the in-AD devices being connected to content server 20 via these routers.

System 1a will now be described in detail with reference to the drawings.

FIG. 10 shows a structure of system 1a. As shown in FIG. 10, system 1a includes routers 10, 11, 11a, 11b and 12, a content server 20, and terminals 30a and 30b. Routers 11 and 12 are connected to router 10, which is in turn connected to Internet 60. Routers 10, 11, 11a and 11b are in-AD relay devices, and router 12 is an out-AD relay device.

Content server 10 and router 11a are connected to router 11, terminal 30a and router 11b are connected to router 11a, and terminal 30b is connected to router 11b. One or more terminals are connected to router 12, although depiction and description of these terminals is omitted here.

The devices in system 1a communicate using IPv4 as a communication protocol.

Since content server 20 in system 1a has the same structure and function as content server 20 in system 1, description is omitted here.

Figure 11:
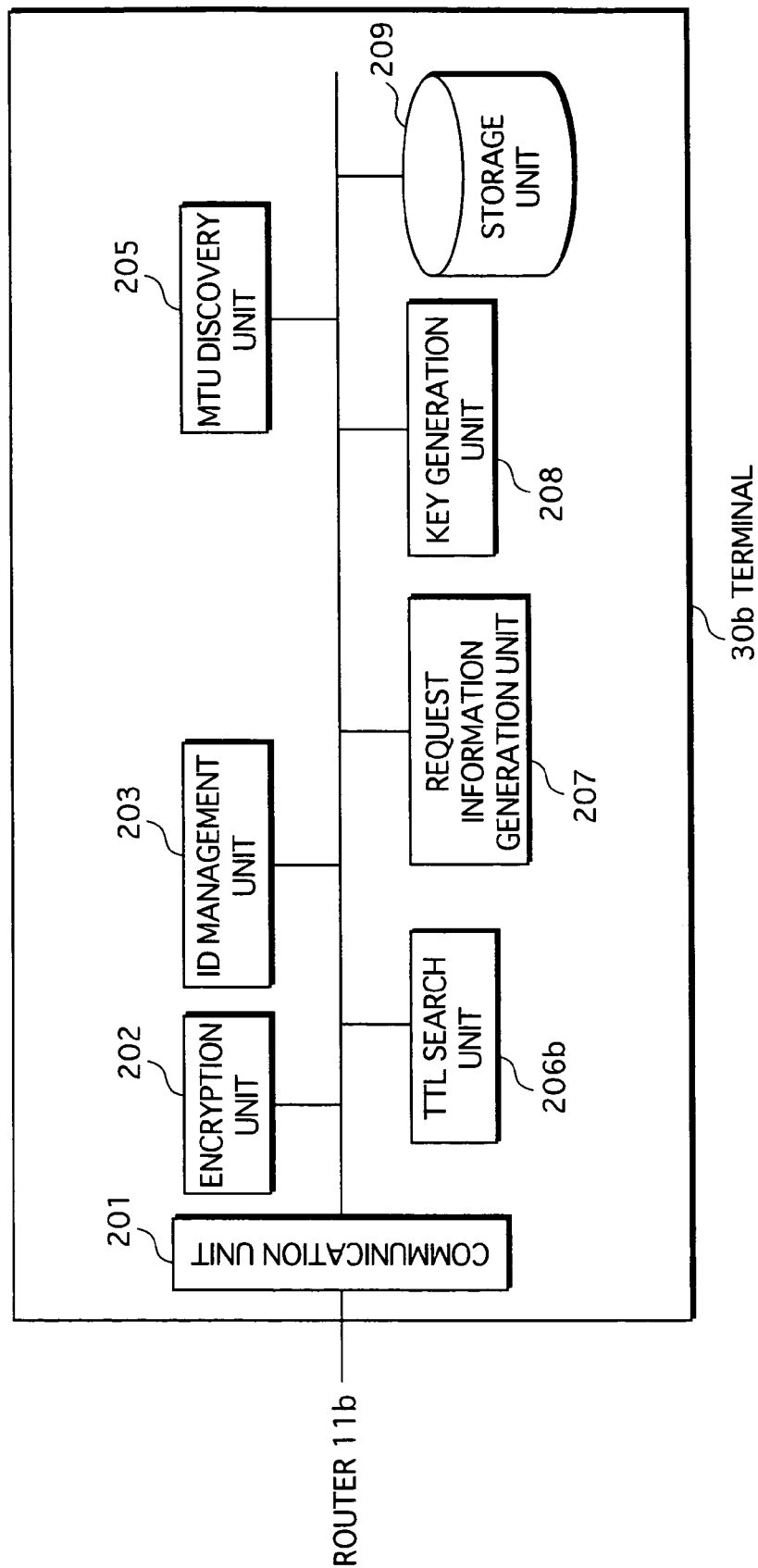
FIG. 11 is a functional block diagram showing a functional structure of a terminal 30b.

FIG. 11 is a functional block diagram showing a functional structure of terminal 30b. As shown in FIG. 11, terminal 30b is constituted from a communication unit 201, an encryption unit 202, an ID management unit 203, an MTU discovery unit 205, a TTL search unit 206b, a request-information generation unit 207, a key generation unit 208, and a storage unit 209. Components in terminal 30b having the same function as components in terminal 30 (FIG. 3) are shown using the same reference signs. Description of these components is omitted here.

Terminal 30b differs from terminal 30 in that information-acquisition unit 204 and search-information generation unit 206 are omitted and TTL search unit 206b is included. Since terminal 30b needs to know what TTL to set in order to communicate with content server 20, TTL search unit 206b functions to search for the correct TTL.

Figure 12:
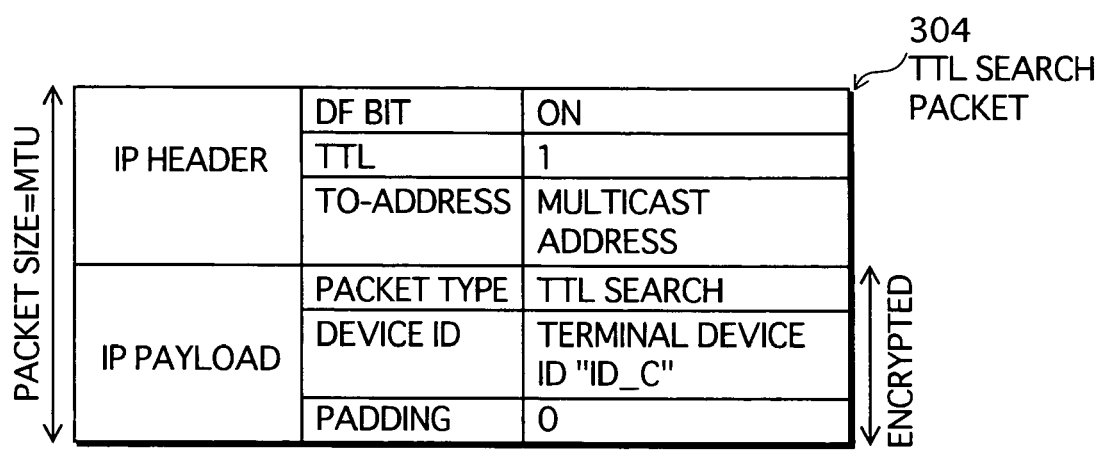
FIG. 12 shows a data structure of a TTL-search packet 304.

TTL search unit 206b generates TTL search packet 304 shown in FIG. 12. As shown in FIG. 12, TTL search packet 304 is constituted from an IP header and an IP payload. The IP header includes an "on" DF bit, an "n" TTL and a "multicast address" to-address. The IP payload includes a "TTL search" packet type, an "ID_C" device ID, and "0" padding data. Here, "n" is an integer such that $1 \leq n < 255$. Device ID "ID_C", which uniquely identifies terminal 30b, is specifically 8-bit data unique to terminal 30b that is stored in ID management unit 203. Description of terminal 30a, which has the same structure and function as terminal 30b, omitted here.

Figure 13:
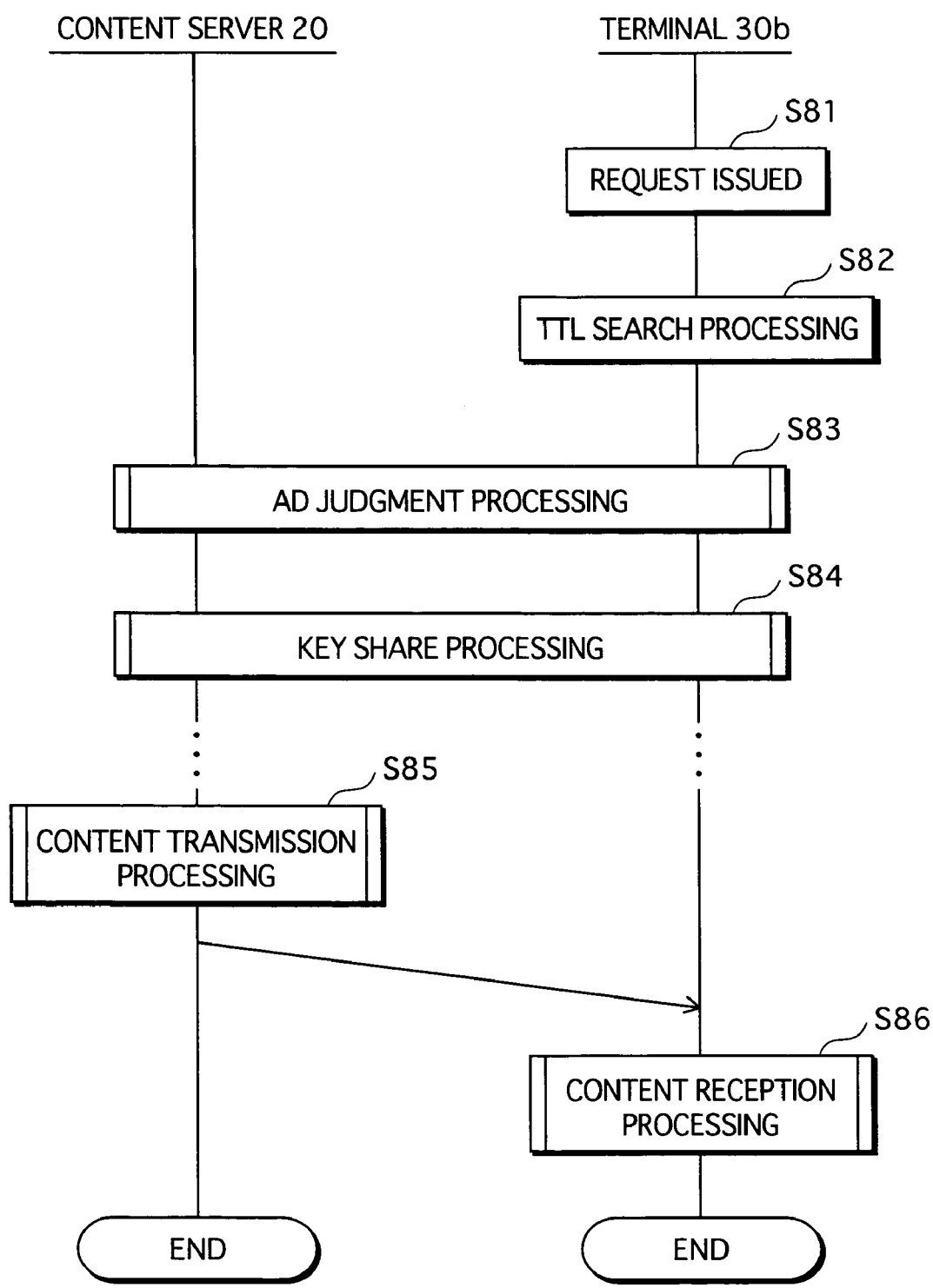

FIG. 13 is a flowchart showing the overall operations performed in system 1a.

When a request issues in terminal 30b (step S81), terminal 30b performs TTL search processing (step S82) to search for a TTL to set in order to communicate with content server 20. When the TTL is determined, AD-judgment processing is performed between content server 20 and terminal 30b (step S83), followed by key-share processing (step S84). Content server 20 then performs content-transmission processing (step S85), and terminal 30b performs content-reception processing (step S86).

It should be noted that since terminal 30a performs the same operations as terminal 30b, the FIG. 13 flowchart depicts only the operations of content server 20 and terminal 30b for ease of description.

Figure 14:
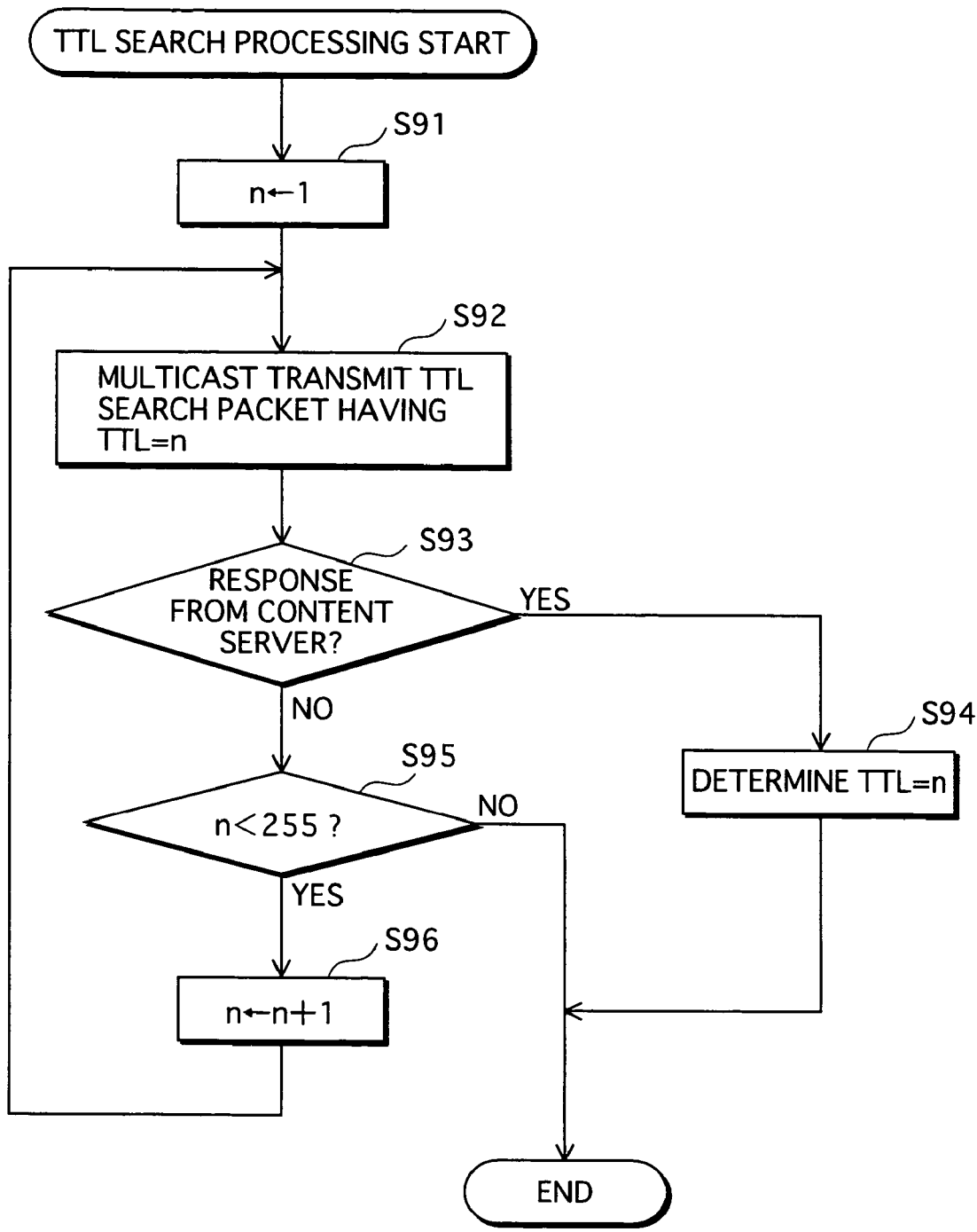

Operations performed to search for a TTL that will allow terminal 30b to communicate with content server 20 are described below using the flowchart shown in FIG. 14. These operations expand on step S82 in the FIG. 13 flowchart.

TTL search unit 206b firstly sets n to "1" (step S91). Unit 206b then generates a TTL search packet in which the TTL is set to "n". Communication unit 201 multicast transmits the TTL search packet after encryption unit 202 has encrypted the IP payload (step S92).

When a confirmation packet is received from content server 20 (step S93=YES), TTL search unit 206b determines n to be the TTL used in communication with content sever 20 (step S94), and ends the processing.

When a confirmation packet is not received from content server 20 (step S93=NO), TTL search unit 206b judges whether n is a number smaller than 255. If n is greater than or equal to 255 (step S95=NO), unit 206b judges the search to have failed, and ends the processing.

If n is less than 255 (step S95=YES), TTL search unit 206b sets n to n+1, and returns to step S92 to continue the processing.

Terminal 30b continues generating and multicast transmitting TTL search packets in which the TTL is incremented from 1 to 255, until a reply is received from content server 20.

Figure 15:
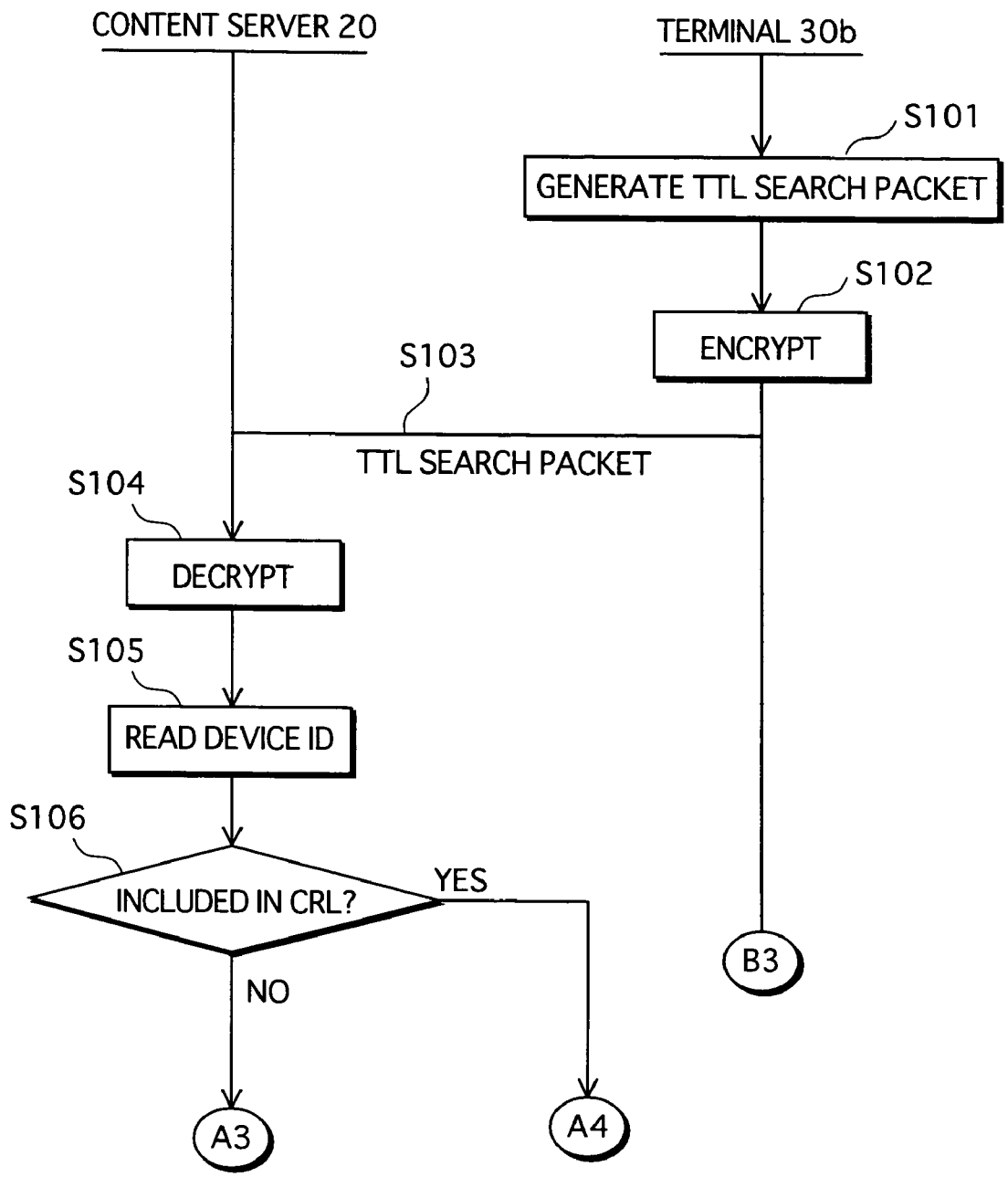
FIG. 15 is a flowchart of AD-judgment processing performed in content distribution system 1a (cont.
Figure 16:
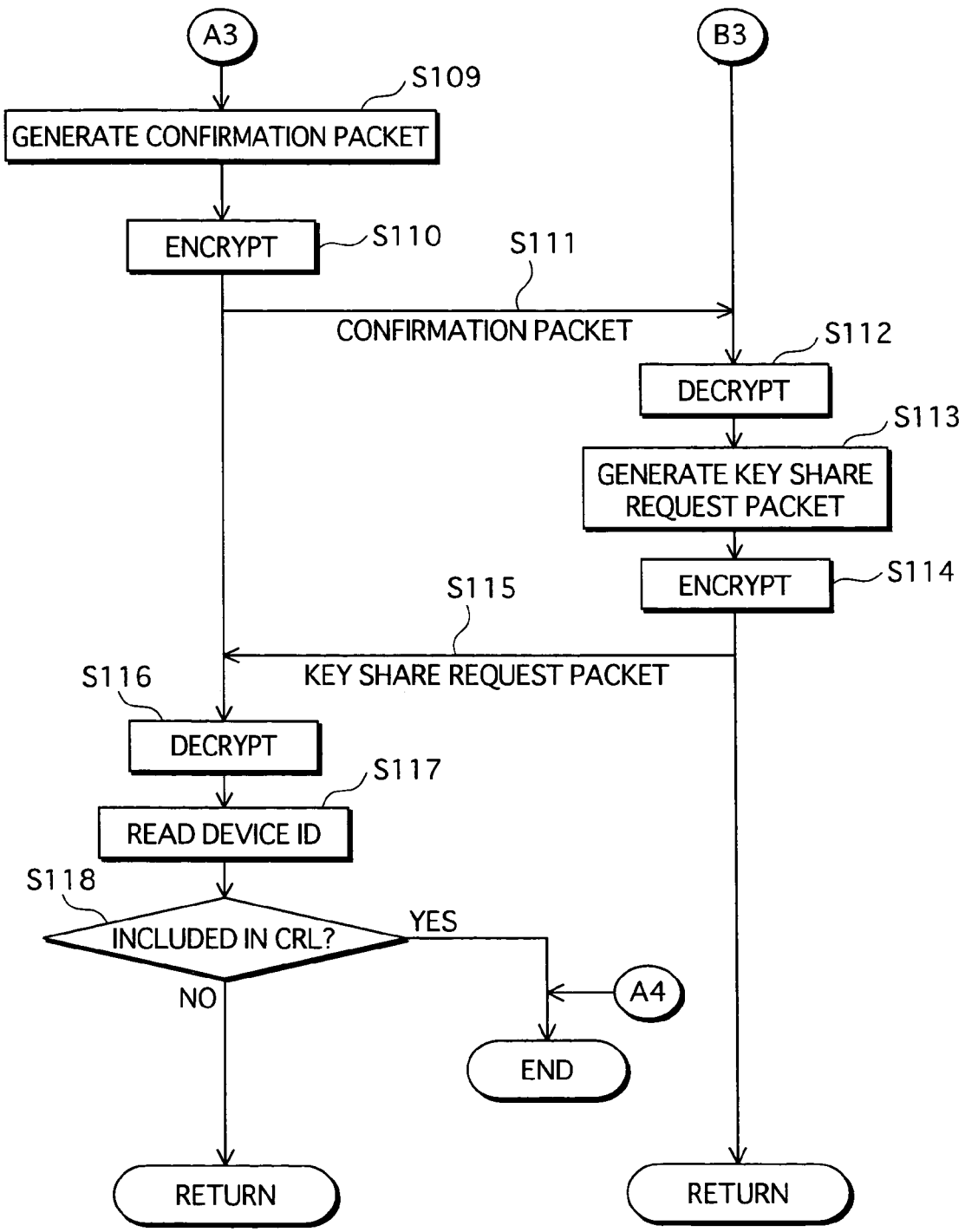
in FIG. 16)

AD-judgment processing is described below using the flowcharts shown in FIGS. 15 and 16. The processing described here expands on step S83 in the FIG. 13 flowchart and includes the processing shown in the FIG. 14 flowchart.

TTL search unit 206 in terminal 30b generates a TTL search packet (step S101), and encryption unit 202 encrypts the IP payload of the generated packet (step S102). Communication unit 201 multicast transmits the TTL search packet, and communication unit 101 in content server 20 receives the TTL search packet (step S103).

Encryption unit 102 decrypts the encrypted IP payload (step S104). AD-judgment unit 106 reads the device ID of the originator (terminal 30b) included in the IP payload of the TTL search packet (step S105), refers to the internally stored CRL, and judges whether the device ID of terminal 30b is listed in the CRL (step S106). If listed (step S106=YES), content server 20 ends the processing.

If judged that the device ID is not listed in the CRL (step S106=NO), AD-judgment unit 106 instructs confirmation-information generation unit 107 to generate a confirmation packet. Unit 107 generates a confirmation packet whose TTL is set to the TTL included in the TTL search packet and that includes the IP address of content server 20 (step S109), and outputs the generated packet to encryption unit 102. Unit 102 encrypts the IP payload of the confirmation packet (step S110). Communication unit 101 then transmits the confirmation packet to terminal 30b, which receives the confirmation packet (step S111).

Encryption unit 202 in terminal 30b decrypts the encrypted IP payload of the received confirmation packet (step S112), and outputs then confirmation packet to request-information generation unit 207. Unit 207 generates a key-request packet in which the to-address is set to the IP address of content server 20 included in the IP payload of the confirmation packet, the TTL is set to n determined at step S94, and the data size of the packet is set to the MTU (step S113).

Request-information generation unit 207 outputs the generated key-request packet to encryption unit 202, and unit 202 encrypts the IP payload of the key-request packet (step S114). Communication unit 201 then transmits the key-request packet to content server 20, which receives the key-request packet (step S115).

Encryption unit 102 in content server 20 decrypts the encrypted IP payload of the received key-request packet (step S116), and then outputs the key-request packet to AD-judgment unit 106. Unit 106 reads the device ID of terminal 30b from the IP payload of the key-request packet (step S117), refers to the stored CRL, and judges whether the device ID of terminal 30b is listed in the CRL (step S118). If listed (step S118=YES), content server 20 ends the processing.

If the device ID of terminal 30b is not listed in the CRL (step S118=NO), content server 20 and terminal 30b move on to the step S84 processing in FIG. 13.

Figure 8:
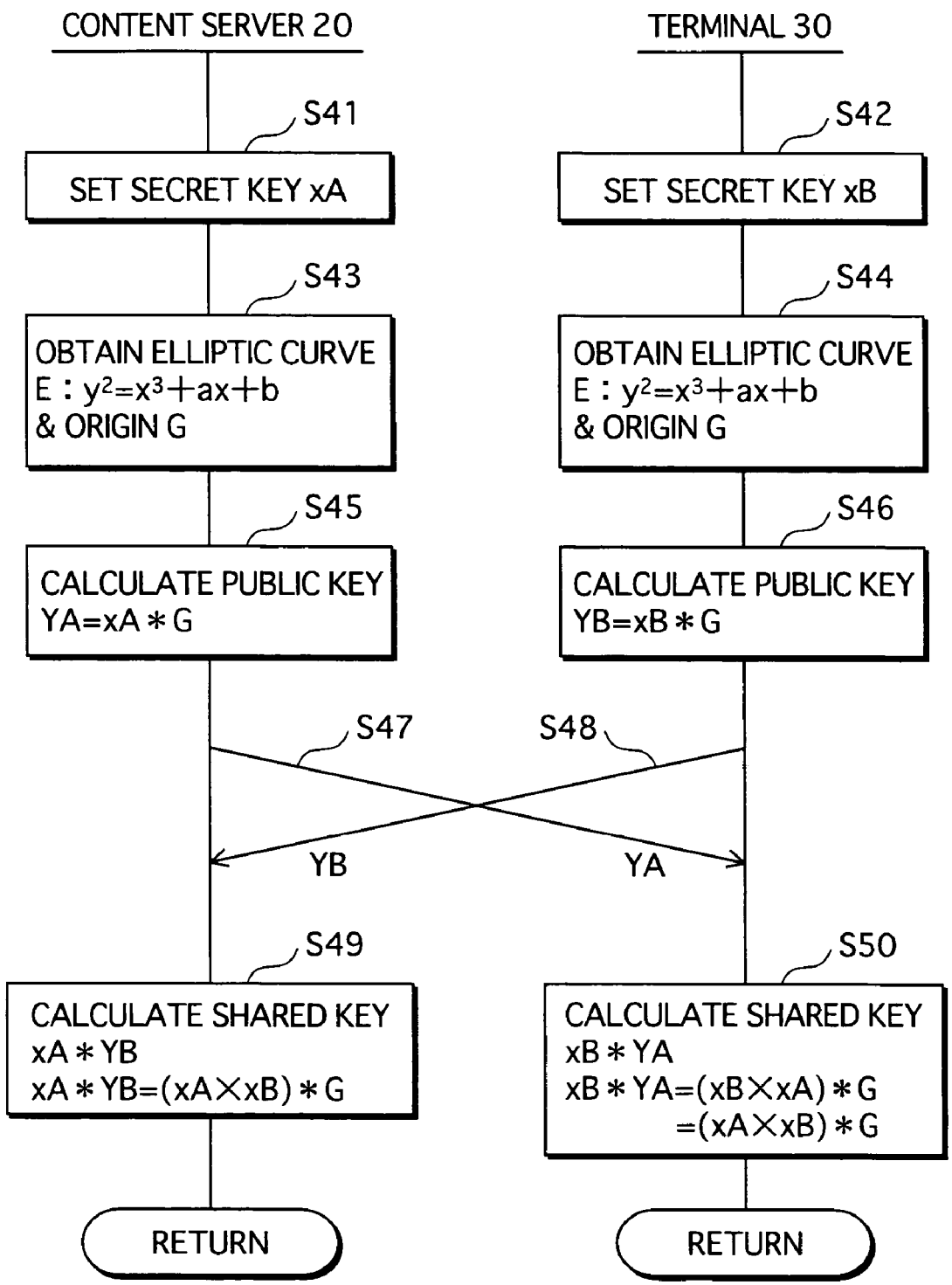
FIG. 8 is a flowchart of key-share processing performed in content distribution system 1.
Figure 9B:
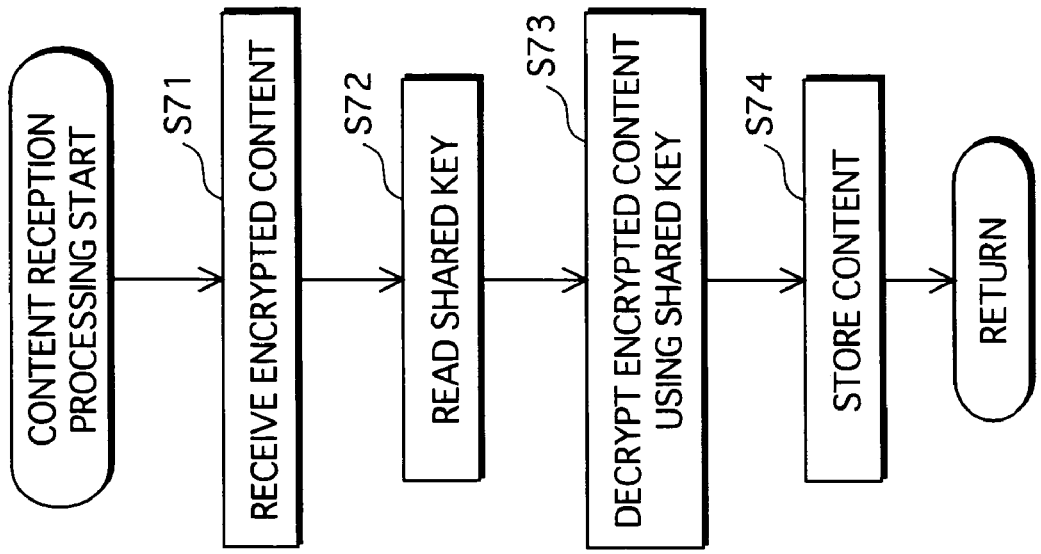
FIG. 9B is a flowchart of content reception processing performed in content distribution system 1.
Figure 9A:
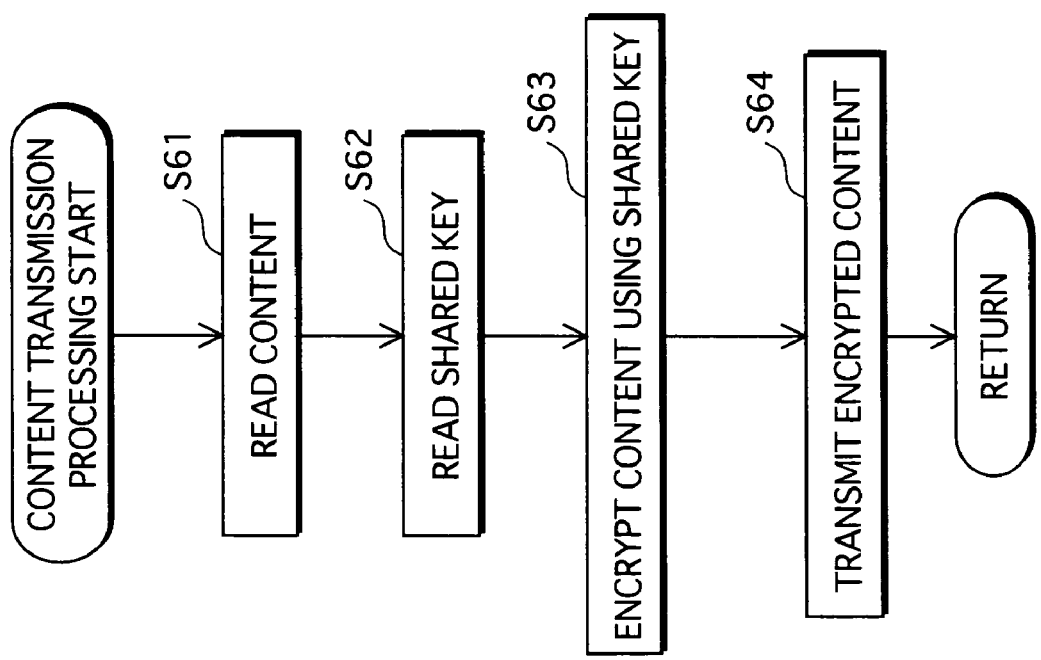
FIG. 9A is a flowchart of content transmission processing performed in content distribution system 1.

Since the detailed processing operations at steps S84, S85 and S86 in FIG. 13 are the same as those shown in FIGS. 8, 9a and 9b, description is omitted here.

Variation 2

A content distribution system 1b (hereinafter "system 1b") described below is a variation of content distribution system 1.

In system 1b, AD-judgment processing and key-share processing are performed at the same time rather than consecutively, by having the devices transmit/receive packets whose TTL has been set to "1". System 1b is described below in detail with reference to the drawings.

Figure 17:
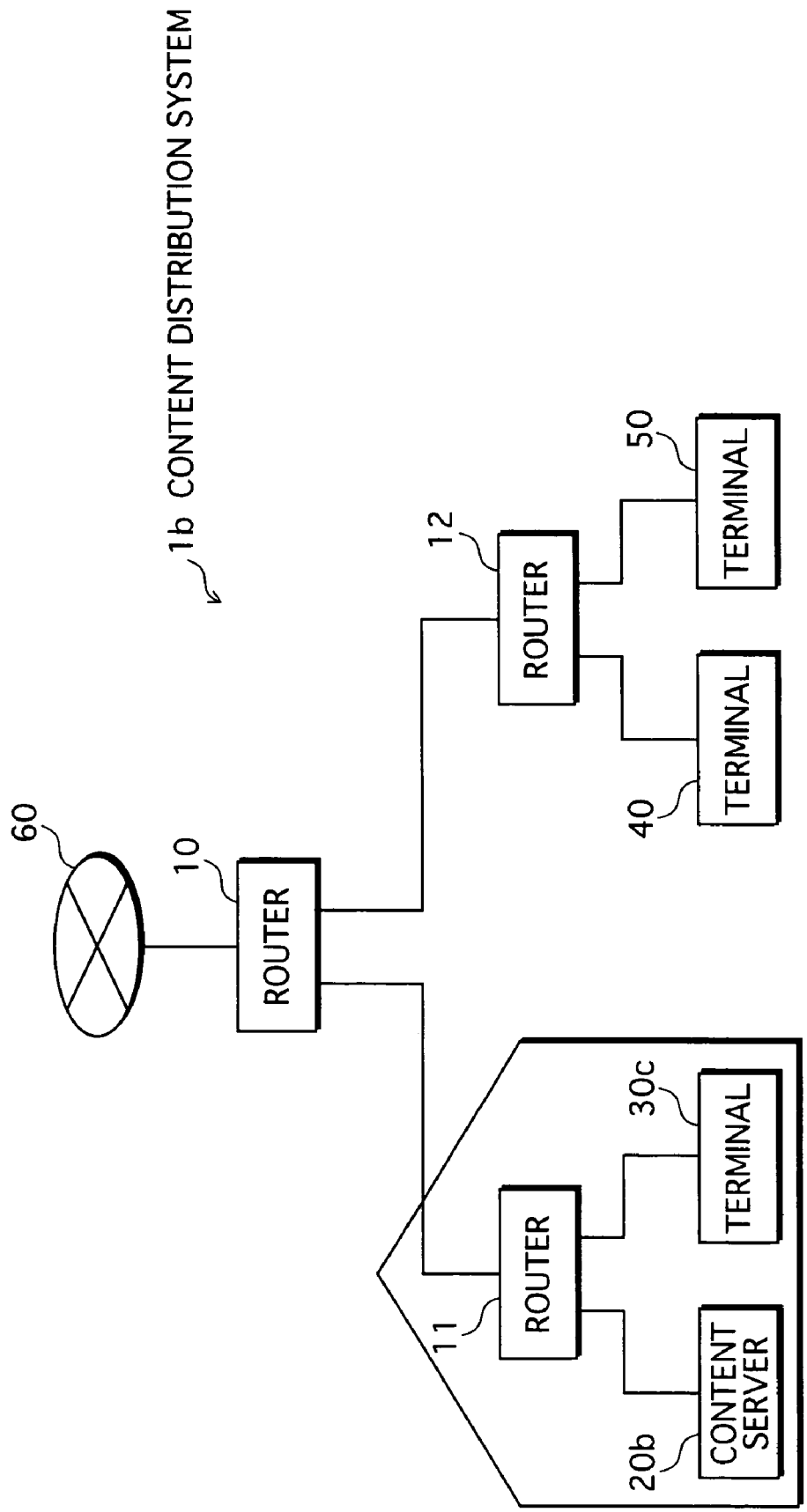
FIG. 17 shows a structure of a content distribution system 1b.

FIG. 17 shows a structure of system 1b. System 1b is constituted from routers 10, 11 and 12, a content server 20b, and terminals 30c, 40 and 50. Since routers 10, 11 and 12, and terminals 40 and 50 have the same structure and function as components in system 1 (FIG. 1) marked by the same reference signs, description is omitted here. The following description relates to content server 20b and terminal 30c, which have different structures and functions to components in system 1.

Figure 18:
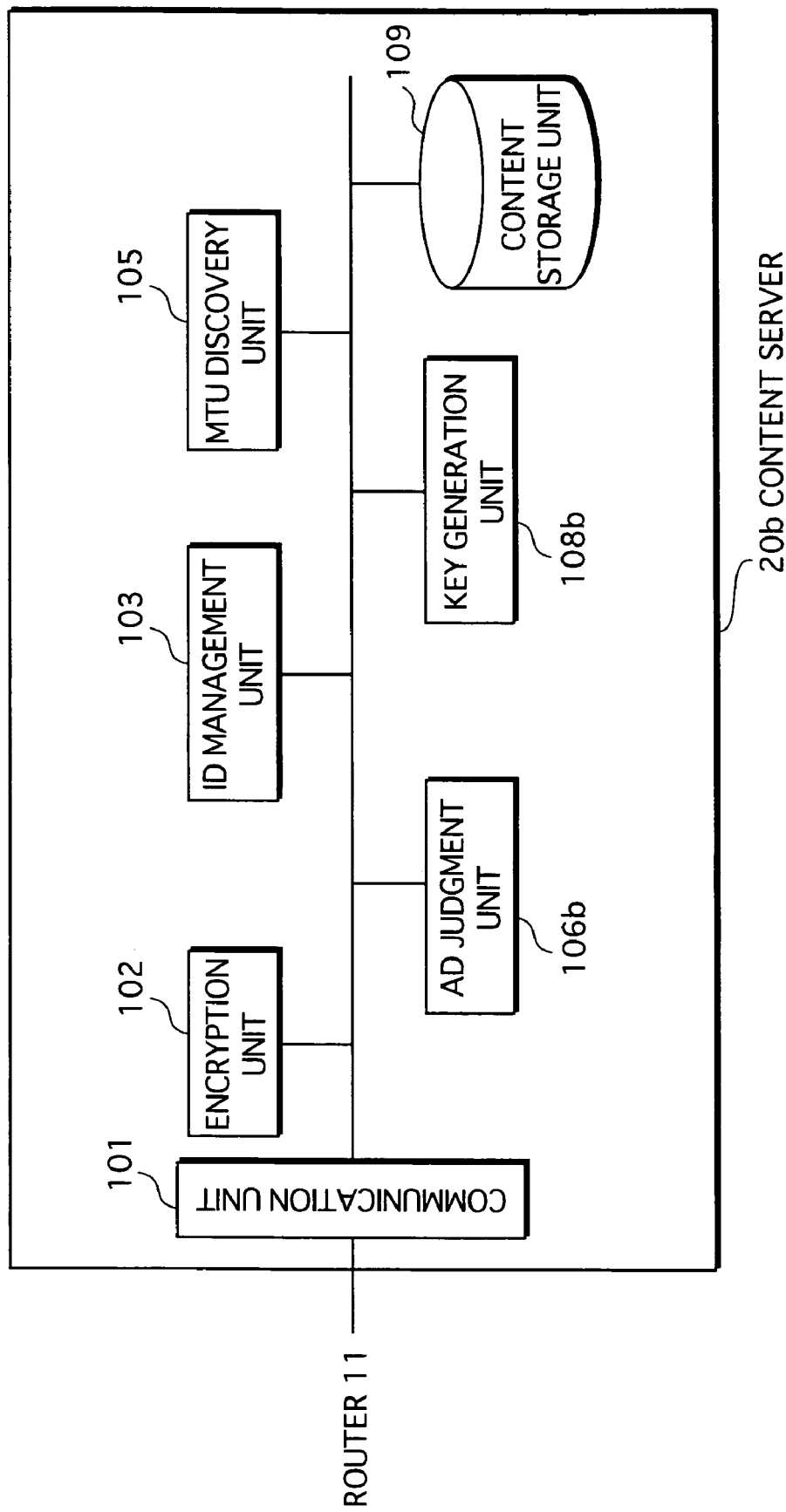
FIG. 18 is a functional block diagram showing a functional structure of a content server 20b.

FIG. 18 is a functional block diagram showing a functional structure of content server 20b. As shown in FIG. 18, content server 20b is constituted from a communication unit 101, an encryption unit 102, an ID management unit 103, a maximum transmission unit (MTU) discovery unit 105, an AD-judgment unit 106b, a key-generation unit 108b, and a content storage unit 109. Components in content servers 20 (FIG. 2) and 20b (FIG. 18) having the same functions are marked using the same reference signs. Description of these components is omitted here.

AD-judgment unit 106b reads the TTL included in public-key packets received from terminal 30c, and judges the packets to have been sent from an in-AD terminal if the read TTL is "1". Public-key packets received from terminal 30c are described in detail in a later section.

As with key-generation unit 108 in content server 20, an external management center provides key-generation unit 108b with elliptic curve E: $y^2=x^3+ax+b$ and origin G in advance. Unit 108b sets the secret key xA, and calculates the public key YA=xA*G. Unit 108b divides the public key YA to generate public-key packets, and sequentially transmits the generated packets to terminal 30c via encryption unit 102 and communication unit 101.

Figure 20A:
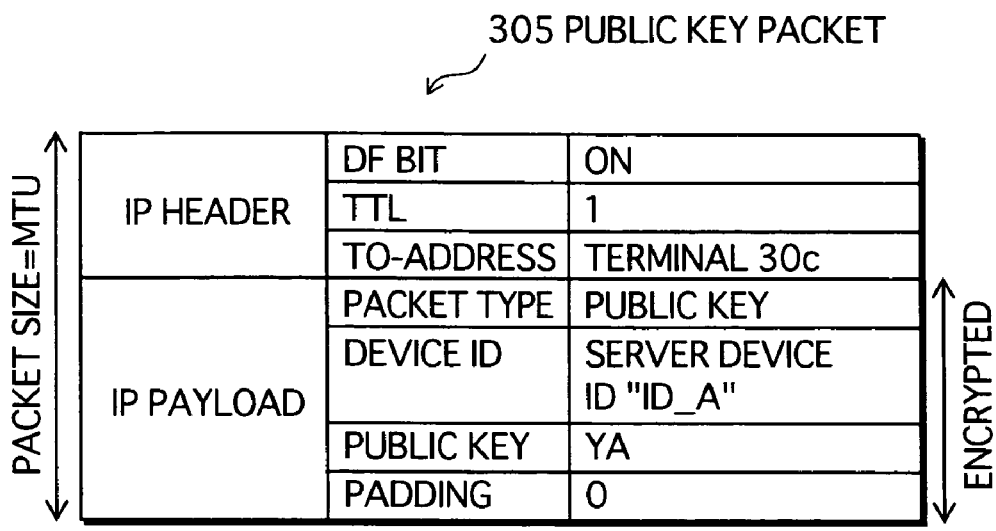
FIG. 20A shows a data structure of a public-key packet 305.

FIG. 20A shows the data structure of a public-key packet 305, which is an exemplary public-key packet generated by content server 20b. As shown in FIG. 20A, public-key packet 305 is constituted from an IP header and an IP payload. The IP header includes an "on" DF bit, a "1" TTL, and a "terminal 30c" to-address. The IP payload includes a "public key" packet type, an "ID_A" device ID, a "YA" public key, and "0" padding data.

Key-generation unit 108b prevents encapsulation by setting the DF bit to "on", and prevents public-key packet 305 from being transmitted beyond router 11 (i.e. out of the authorized domain) by setting the TTL to "1". Here, content server 20b is assumed to know the IP address of terminal 30c set in the to-address by unit 108b.

As shown in FIG. 20A, the data size of public-key packet 305 is the same as the MTU. To generate packet 305, key-generation unit 108b acquires the MTU from MTU discovery unit 105 and pads the packet to make the data size equal the acquired MTU. Public-key packet 305 is then transmitted to terminal 30c after encryption unit 102 has encrypted the IP payload.

Key-generation unit 108b receives public-key packets from terminal 30c via communication unit 101 and encryption unit 102, accumulates the received public-key packets, and generates public key YB using the accumulated public-key packets. Unit 108b generates shared key xA*YB by calculating xA*YB from the secret key xA of content server 20b and the generated public key YB of terminal 30c. Unit 108b then stores the shared key xA*YB internally.

After storing the shared key xA*YB, key-generation unit 108b instructs content unit 109 to read a content.

FIG. 19 is a functional block diagram showing a structure of terminal 30c. As shown in FIG. 19, terminal 30c is constituted from a communication unit 201, an encryption unit 202, an ID management unit 203, an MTU discovery unit 205, a key-generation unit 208c, and a storage unit 209.

The same reference signs are used to designate components common to both terminals 30 (FIG. 3) and 30c (FIG. 19). Description of these components is omitted here. Terminal 30c differs from terminal 30 in that it does not include information acquisition unit 204, search information generation unit 206, or request information generation unit 207.

As with key-generation unit 208 in terminal 30, the external management center provides key-generation unit 208c with elliptic curve E: $y^2=x^3+ax+b$ and origin G in advance.

Key-generation unit 208c sets the secret key xB, and calculates public key YB=xB*G. Unit 208c then divides the generated public key YB to generate public-key packets, and sequentially transmits the generated packets to content server 20b via encryption unit 202 and communication unit 201.

Figure 20B:
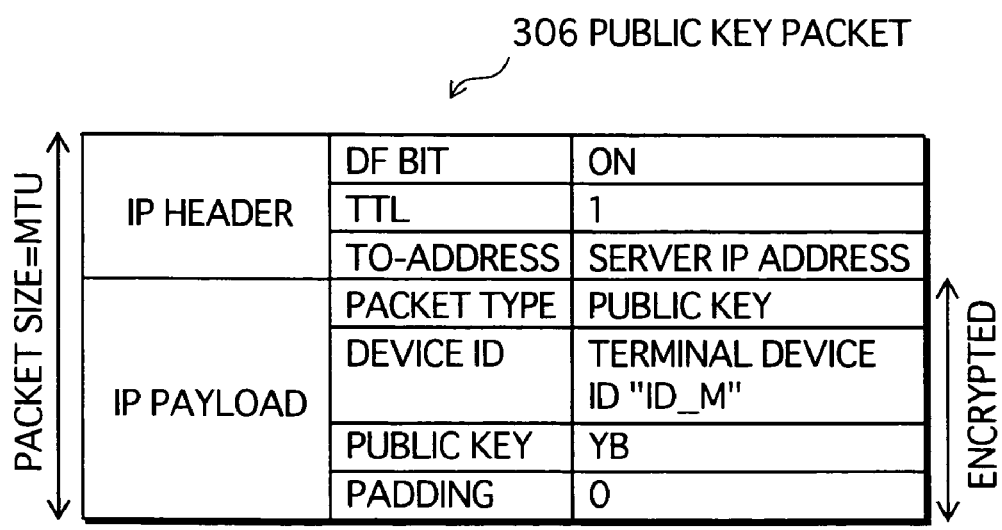
FIG. 20B shows a data structure of a public-key packet 306.

FIG. 20B shows the data structure of a public-key packet 306, which is an exemplary public-key packet generated by terminal 30c. As shown in FIG. 20B, public-key packet 306 is constituted from an IP header and an IP payload. The IP header includes an "on" DF bit, a "1" TTL, and a "server IP address" to-address. The IP payload includes a "public key" packet type, an "ID_M" device ID, a "YB" public key, and "0" padding data. Here, "ID_M" is 8-byte data used for uniquely identifying terminal 30c.

Key-generation unit 208c prevents encapsulation by setting the DF bit to "on", and prevents public-key packet 306 from being transmitted beyond router 11 (i.e. out of the authorized domain) by setting the TTL to "1". Here, terminal 30c is assumed to know the IP address of content server 20b set in the to-address by unit 208c.

As shown in FIG. 20B, the data size of public-key packet 306 is the same as the MTU. To generate packet 306, key-generation unit 208c acquires the MTU from MTU discovery unit 205 and pads the packet to make the data size equal the acquired MTU. Public-key packet 306 is then transmitted to content server 20b after encryption unit 202 has encrypted the IP payload.

Key-generation unit 208c receives public-key packets from content server 20b via communication unit 201 and encryption unit 202, accumulates the received public-key packets, and generates the public key YA using the accumulated public-key packets.

Unit 208c generates shared key xB*YA by calculating xB*YA from the secret key xB of terminal 30c and the generated public key YA of content server 20b. Unit 208c then stores the shared key xB*YA internally.

The operations of system 1b are described below using the flowcharts shown in FIGS. 21 and 22.

Figure 21:
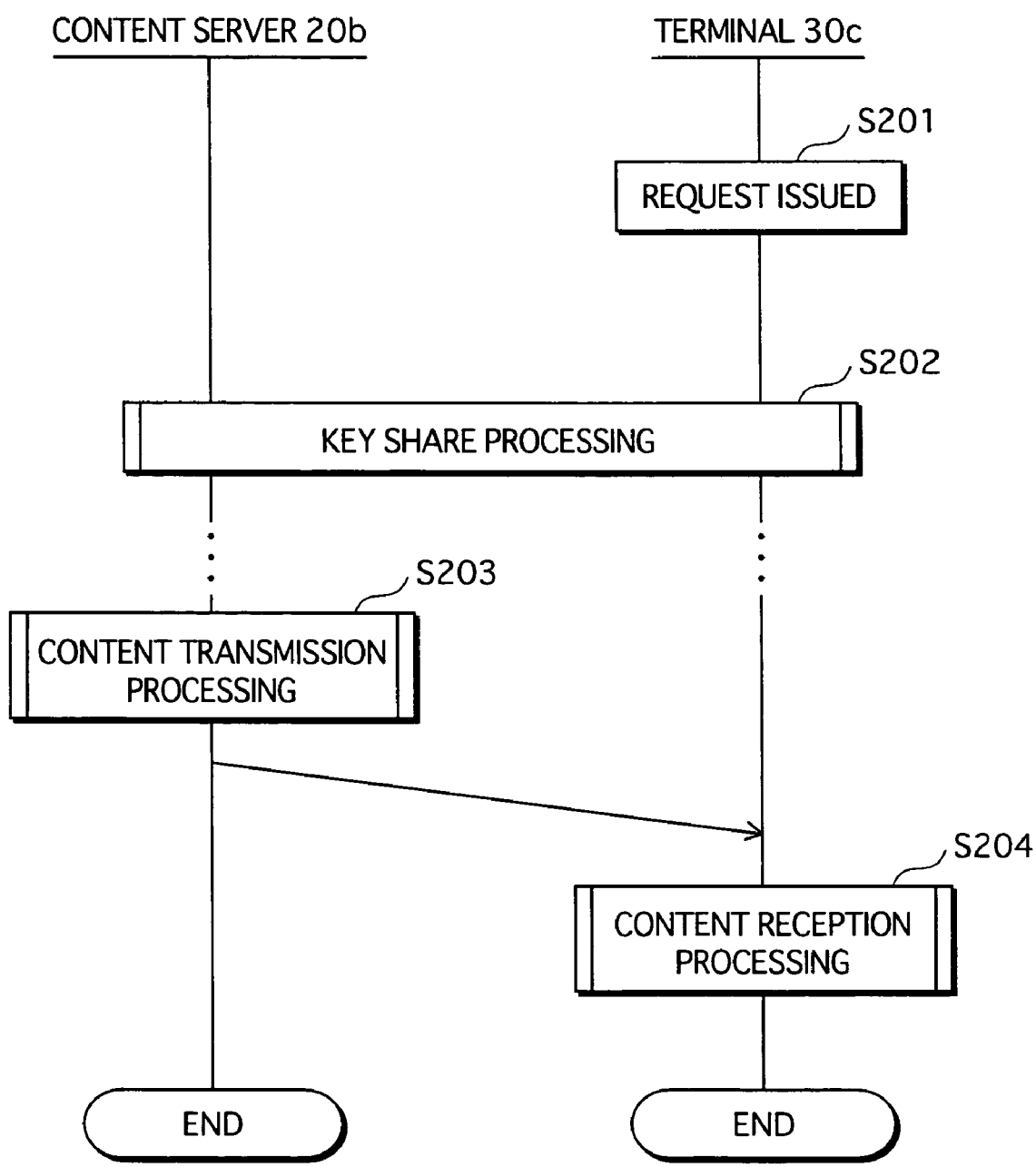
FIG. 21 is a flowchart showing the overall operations performed in content distribution system 1b.

FIG. 21 is a flowchart showing the overall operations of system 1b. When a request issues in terminal 30c (step S201), key-share processing is performed between content server 20b and terminal 30c (step S202). Next, content server 20b performs content transmission processing (step S203), and terminal 30c performs content reception processing (step S204).

Figure 22:
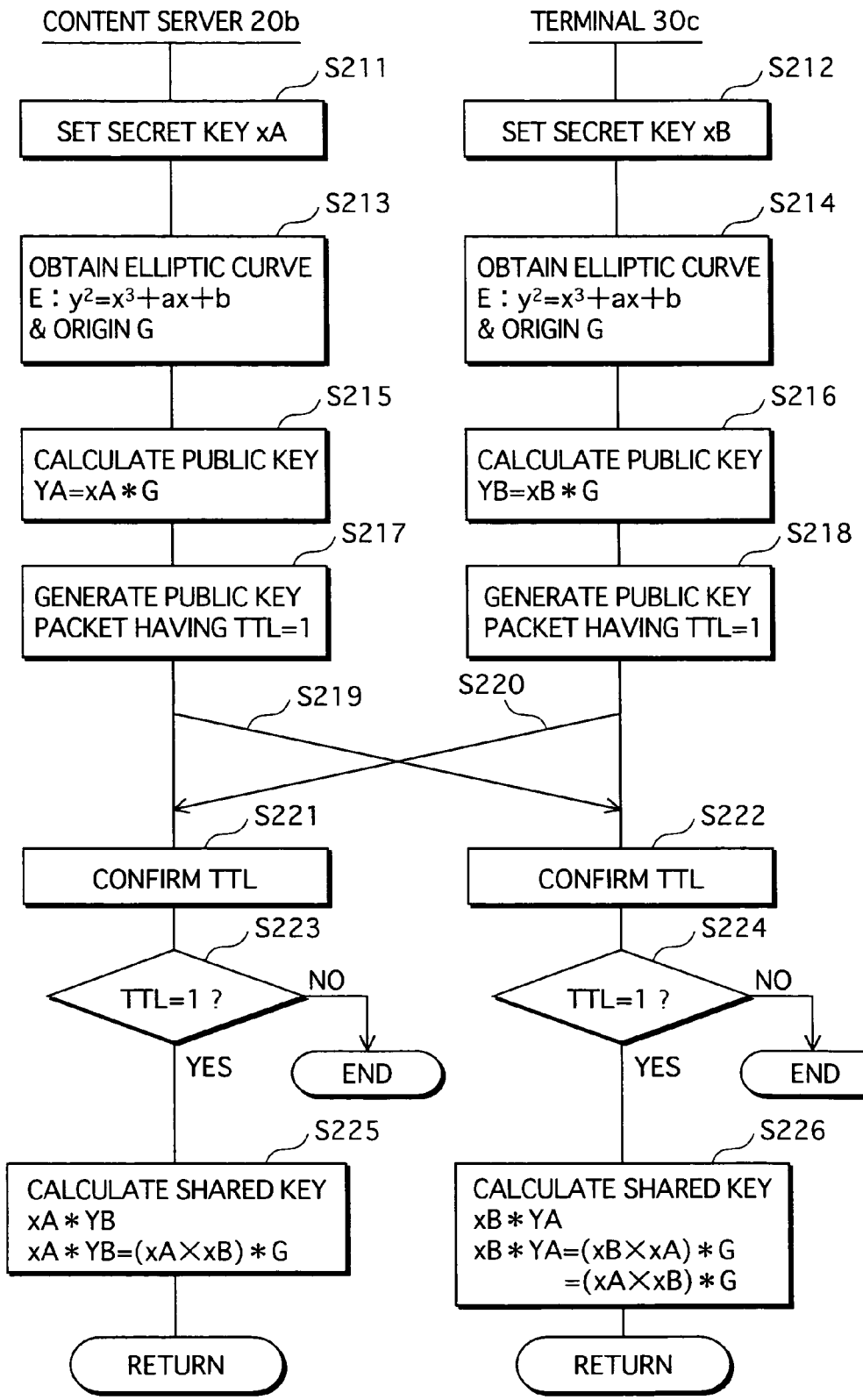
FIG. 22 is a flowchart of key-share processing performed in content distribution system 1b.

FIG. 22 is a flowchart of the key-share processing. The operations shown in FIG. 22 expand on step S202 in the FIG. 21 flowchart.

Content server 20b sets the secret key xA (step S211), and terminal 30c sets the secret key xB (step S212).

Content server 20b and terminal 30c both acquire elliptic curve E: $y^2=x^3+ax+b$ and origin G from the management center (steps S213, S214).

Content server 20b calculates public key YA=xA*G (step S215), and divides the calculated public key YA to generate public-key packets such as packet 305 shown in FIG. 20A, in which the TTL in the IP header has been set to "1" (step S217). Content server 20b then sequentially transmits the generated public-key packets to terminal 30c, which receives the public-key packets (step S219).

Terminal 30c calculates public key YB=xB*G (step S216), and divides the calculated public key YB to generate public-key packets such as packet 306 shown in FIG. 20B, in which the TTL in the IP header has been set to "1" (step S218). Terminal 30c then sequentially transmits the generated public-key packets to content server 20b, which receives the public-key packets (step S220).

Content server 20b checks the TTL included in the received public key packets (step S221), and if the TTL is "1" (step S223=YES), calculates the shared key xA*YB from the secret key xA set at step S211 and the received public key YB (step S225). If the TTL is not "1" (step S223=NO), content server 20b ends the processing.

Terminal 30c checks the TTL included in the received public-key packets (step S222), and if the TTL is "1" (step S224=YES), calculates the shared key xB*YA from the secret key xA set at step S212 and the received public key YA (step S226). If the TTL is not "1" (step S224=NO), terminal 30c ends the processing.

The shared key calculated by content server 20 can be transformed as follows:

$$xA*YB=(xA \times xB)*G$$

On the other hand, the shared key calculated by terminal 30c can be transformed as follows:

$$xB*YA = (xB \times xA)*G$$
$$= (xA \times xB)*G$$

This shows that the shared keys calculated by content server 20b and terminal 30c are the same.

Key-generation unit 108b in content server 20b and key-generation unit 208c in terminal 30c store respective shared keys internally. Content server 20b and terminal 30c then respectively perform the S203 and S204 processing in the FIG. 21 flowchart.

Since the content transmission processing at step S203 and the content reception processing at step S204 are the same as that performed in system 1 (i.e. FIGS. 9A and 9B, respectively), description is omitted here.

SUMMARY

To summarize the above, in embodiment 1, content server 20 judges whether terminals are in-AD or out-AD terminals, using TTLs set in packets received from the terminals as communication distances showing how far away the terminals are in terms of data communication.

In system 1, terminals multicast transmit server-search packets having a "1" TTL. Server-search packets will not be transmitted to other sub-networks beyond the router to which the terminals are connected. Thus content server 20 only receives server-search packets transmitted from terminal 30 connected to the same router as content server 20.

Content server 20, on receipt of a server-search packet, returns a confirmation packet having a "1" TTL. The confirmation packet will not be transmitted to other sub-networks beyond the router to which content server 20 is connected. Thus terminal 30 connected to the same router as content server 20 is the only terminal able to receive the confirmation packet (i.e. terminals 40 or 50 cannot receive the confirmation packet).

Also, content server 20 and terminal 30, by transmitting/receiving packets having an "on" DF bit and a data size equal to the MTU as a result of padding, prevent IP packets from being forwarded to illegitimate terminals with redundant information appended by other terminals, particularly illegitimate terminals, along the transmission route.

Also, because terminal 30 transmits packets whose IP payload contains the MAC address of the router to which terminal 30 is connected, content server 20 is able to confirm that terminal 30 is connected to the same router.

In the above variation 1, content server 20a and terminal 30 are connected to one another via a plurality of relay devices. Terminal 30 multicast transmits TTL-search packets whose TTL is increased by "1" per packet from a minimum value of "1", until a response is received from content server 20a. When a confirmation packet is received from content server 20a after multicast transmitting a TTL-search packet having an "n" TTL, terminal 30 judges "n" to be the minimum TTL required to communicate with content server 20a. Content server 20a and terminal 30 then perform key-sharing and content transmission/reception using packets in which the TTL is set to "n".

In the above variation 2, when content server 20b and terminal 30 both know each other's IP address, system 1b allows the AD-judgment processing to be performed at the same time that public keys are exchanged while omitting the server-search processing of system 1, by using public-key packets having a "1" TTL in the key sharing.

It should be noted that in variation 2 the TTL set in a public-key packet does not have to be "1". For example, the TTL between content server 20b and terminal 30c may be set to an arbitrary value "n", and AD-judgment performed by confirming that the TTL in received packets is less than or equal to "n".

Also, the processing at steps S222 and S224 in FIG. 22 is not absolutely necessary. For example, a structure may be provided in which only content server 20b confirms that the TTL of received packets is "1".

Furthermore, in variation 2, AD-judgment unit 106b in content server 20b may be structured to store a CRL internally, read the device ID of terminal 30c included in public-key packets received from terminal 30c, and judge whether the read ID is listed in the CRL. If judged that the device ID is listed in the CRL, content server 20b may suppress the transmission of a public-key packet to terminal 30c.

Embodiment 2

A content distribution system 2 is described below as an embodiment 2 of the present invention, with reference to the drawings. As with system 1, content distribution system 2 (hereinafter "system 2") uses the TTL in packets transmitted from terminals to judge whether the terminals are in-AD terminals. However, in comparison with system 1, in which the server and in-AD terminals share keys, system 2 is structured such that the server registers in-AD terminals in a group.

Devices in system 2 communicate using IPv4 as a communication protocol.

Structure

Figure 23:
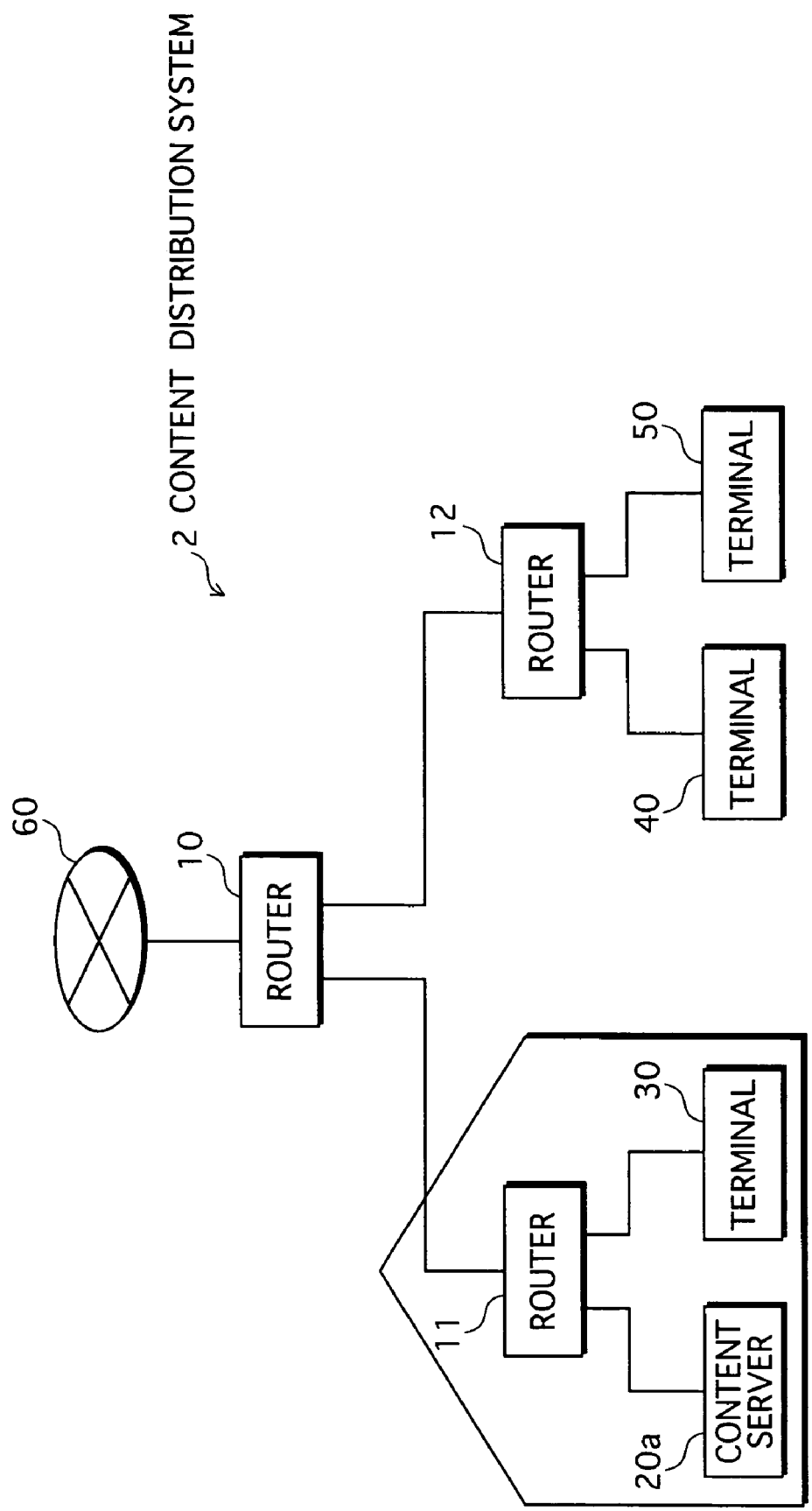
FIG. 23 shows a structure of a content distribution system 2.

FIG. 23 shows a structure of system 2. System 2 is constituted from routers 10, 11 and 12, a content server 20a, and terminals 30, 40 and 50. Since the routers and terminals in system 2 have the same structure and function as those in system 1 (FIG. 1) marked by the same reference signs, description is omitted here. The following description relates to content server 20a, whose function differs from system 1.

Figure 24:
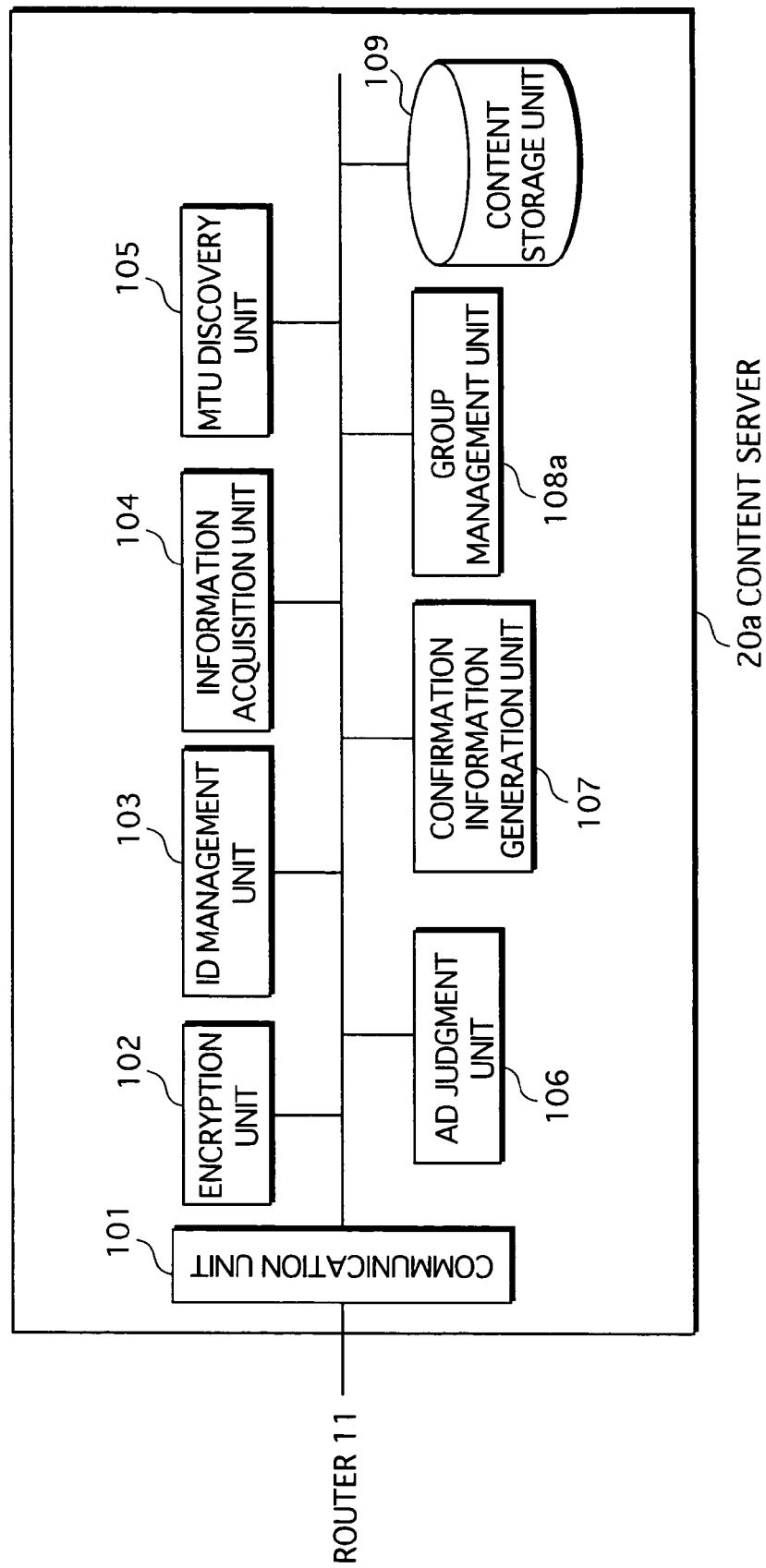

FIG. 24 is a block diagram showing a structure of content server 20a. As shown in FIG. 24, content server 20a is constituted from a communication unit 101, an encryption unit 102, an ID management unit 103, an information acquisition unit 104, a maximum transmission unit (MTU) discovery unit 105, an AD-judgment unit 106, a confirmation-information generation unit 107, a group-management unit 108a, and a content storage unit 109. Components having the same function as those in content server 20 (FIG. 2) are marked using the same reference signs. Description of these components is omitted here.

Group-management unit 108a manages information relating to terminals judged by AD-judgment unit 106 to be in-AD terminals (hereinafter, "in-group terminals"). More specifically, unit 108a generates request IDs when instructed by AD-judgment unit 106, and transmits generated request IDs to in-group terminals. Unit 108a also registers in-group terminals in a group table 350 shown in FIG. 25, corresponding request IDs with the device IDs of the in-group terminals in table 350.

Group table 350 is constituted such that request IDs are corresponded to device IDs for all terminals judged by by AD-judgment unit 106 to be in-AD terminals. For example, "CID_0001" is the request ID corresponded to device ID "ID_E". Likewise, "CID_0002" is the request ID corresponded to device ID "ID_F".

Also, when a transmission request is received that includes the device ID and request ID of the terminal making the request, group-management unit 108a judges whether the received device and request IDs are registered in group table 350.

When judged that the received device and request IDs are registered, group-management unit 108a reads a content from content storage unit 109, and transmits the read content to the requesting terminal via communication unit 101.

Operations

The operations of system 2 are described below using the flowcharts shown in FIGS. 26A and 26B. It should be noted that while the FIGS. 26A and 26B flowcharts depict only the operations of content server 20a and terminal 30, the operations of terminals 40 and 50 are the same as those of terminal 30.

Figure 26A:
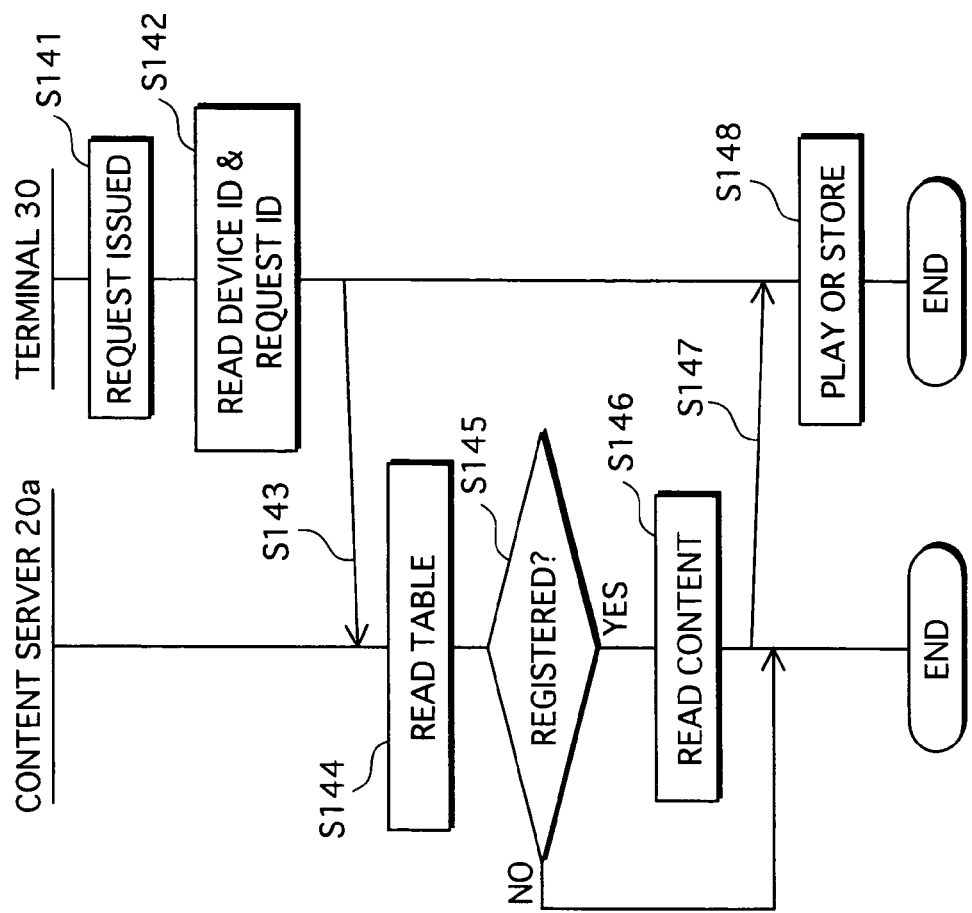
FIG. 26A is a flowchart showing the overall operations performed in content distribution system 2.

The FIG. 26A flowchart shows group-registration processing performed in system 2.

Firstly, when a request issues in terminal 30 (step S131), AD-judgment processing is performed between content server 20a and terminal 30 (step S132).

Next, content server 20a generates a request ID (step S133) and transmits the generated ID to terminal 30, which receives the request ID (step S134).

Group management 108a in content server 20a registers terminal 30 in group table 350 by corresponding the request ID generated at step S133 with the device ID of terminal 30 (step S135). Terminal 30 stores the request ID received at step S134 in ID management unit 203 (step S136).

Figure 26B:
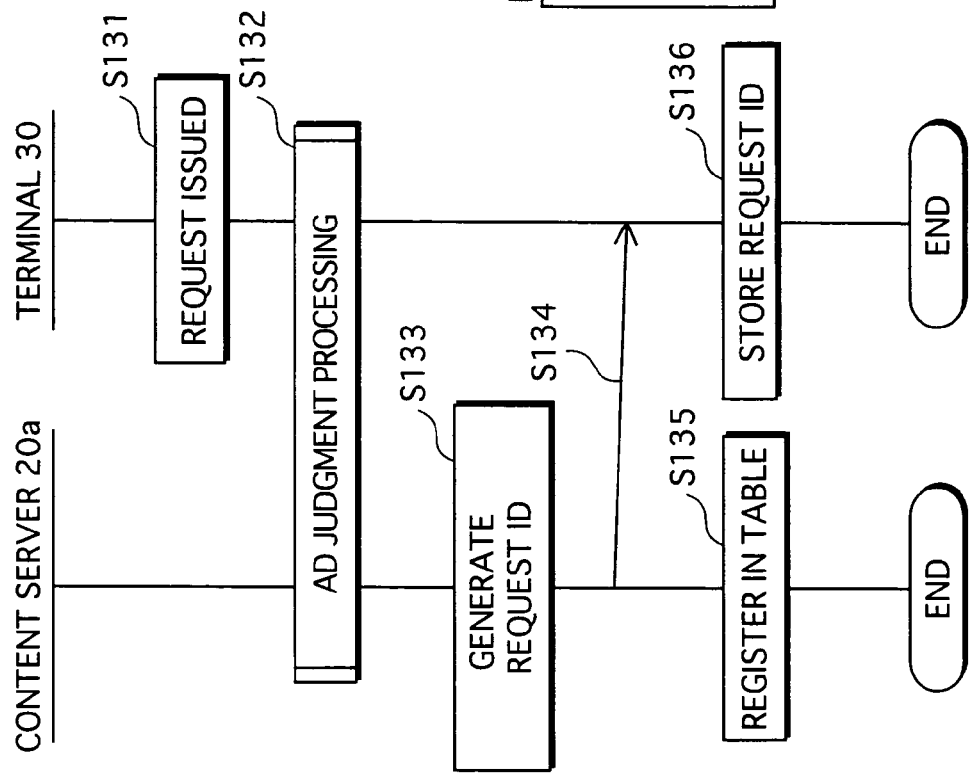
FIG. 26B is a flowchart of content-request processing performed in content distribution system 2.

The FIG. 26B flowchart shows content-request processing operations performed in system 2.

Firstly, when a request issues in terminal 30 (step S141), ID management unit 203 reads the stored device ID and request ID (step S143) and transmits the read IDs to content server 20a via communication unit 201, which receives the IDs (step S143).

Group management 108a in content server 20a reads the stored group table 350 (step S144), and judges whether the device and request IDs received from terminal 30 are registered in the read table (step S145).

If the received IDs are judged to be registered in group table 350 (step S145=YES), group management 108a reads a content from content storage unit 109 (step S146) and transmits the read content to terminal 30 via communication unit 101, and terminal 30 receives the content (step S147). Terminal 30 either plays back the received content or stores it in storage unit 209 (step S148).

When judged that the received device ID and request ID are not registered (step S145=NO), content server 20a ends the processing.

SUMMARY

To summarize embodiment 2, the communication device includes: an acquiring unit operable to acquire a communication distance indicating how far the communication device is from another communication device in data communication; a distance judging unit operable to judge whether the acquired communication distance is less than or equal to a predetermined value; and a registering unit operable, when judged in the affirmative, to register the other communication device in a group.

The communication device conducts data communication with the other communication device, and the communication distance indicates how many relay devices data transmitted by the other communication device passed through before reaching the communication device.

The communication distance indicates how many routers, as the relay devices, the data passed through from the other communication device to the communication device.

The communication device conducts the data communication in a packet format that includes a TTL whose value decreases by "1" for every router passed through, and the acquiring unit uses the TTL in acquiring the communication distance.

Each packet received from the other communication device includes first identification information that uniquely identifies a router to which the other communication device is connected. Also, the communication device further includes: a router-information acquiring unit operable to acquire second identification information that uniquely identifies a router to which the communication device is connected; an ID judging unit operable to judge whether the first identification information matches the second identification information; and a suppressing unit operable, if judged in the negative, to suppress content transmission/reception by the communication device.

A data size of each packet transmitted/received by the communication device is equal to an MTU of a network to which the communication device is connected, and transmission/reception of partial packets is prohibited.

The TTL included in each packet received from the other communication device is set to a predetermined value at the time of transmission, and the acquiring unit reads a value of the TTL from the received packet, and acquires the communication distance based on the difference between the read value and the predetermined value of the TTL. Here, the predetermined value of the TTL is "1".

The communication device further includes a transmitting unit operable to transmit a content to the other communication device registered in the group by the registration unit.

Also, a group registration system in embodiment 2 is constituted from a first and a second communication device that are connected via one or more relay devices. The second communication device transmits a registration request to the first communication device. The first communication device includes an acquiring unit operable, on receipt of the registration request from the second communication device, to acquire a communication distance indicating how far apart the first and second communication devices are in data communication; a distance judging unit operable to judge whether the acquired communication distance is less than or equal to a predetermined value; and a registering unit operable, when judged in the affirmative, to register the second communication device in a group.

Other Variations

Although described above based on embodiments 1 and 2 as well as variations thereof, the present invention is not of course limited to these embodiments, the following cases also being included.

(1) In the above embodiments, the content server uses the TTL included in packets received from terminals to judges whether the terminals are in-AD or out-AD terminals, although AD judgment is not limited to this method. For example, the content server may measure the distance to a terminal, and perform the AD judgment based on the measured distance. Alternatively, the content server may measure the time period required for communication with a terminal, and perform the AD judgment based on the measured time period. It should be noted that no limitations are placed on these methods.

(2) In the above embodiments, devices included in the system are structured so as to communicate using the IPv4 protocol, although the communication protocol applied in the present invention is not of course limited to IPv4. For example, structures involving communication with the IPv6 Protocol are also included in the present invention. In this case, an IPv6 Hop Limit field may be used in AD judgment processing in place of the IPv4 TTL field.

(3) In embodiment 1, devices are constituted to transmit/receive packets having a "1" TTL, although the present invention is not of course limited to a "1" TTL being set in the TTL field.

In embodiment 1, for example, a predetermined TTL value (e.g. "10") may be determined beforehand between a content server and a terminal. The terminal multicast transmits a server-search packet having a "10" TTL. The content server, on receipt of the server-search packet, confirms that the TTL included in the TTL field has not changed from the predetermined value and conducts key sharing with the terminal if the TTL is confirmed to be "10".

(4) In the above embodiments, terminal 30 is directly connected to router 11, although the present invention is not limited to this structure. For example, terminal 30 may be connected to router 11 via a switch, a hub, or the like.

(5) In the above embodiments, a terminal is judged to be in-AD if the TTL in an IP packet is not reduced between transmission and reception of the packet. However, by judging terminals to be in-AD when the TTL in an IP packet is reduced by less than or equal to a predetermined value, it becomes possible to arbitrarily expand the authorized domain. For example, terminals whose TTL is reduced by "2" or less may be judged to be in-AD terminals.

(6) In embodiment 1 and related variations, a terminal that receives an encrypted content from the content server, decrypts and then stores the content in a storage unit. However, the terminal may playback the decrypted content.

(7) In the above embodiments, an encryption key used by an encryption unit to encrypt/decrypt the IP payload of IP packets is a global secret key, although the present invention is not necessary limited to this structure. A method may be applied in which a challenge-response type handshake using zero-knowledge proof to share a session key is conducted prior to any communication.

(8) In the above embodiments, devices are structured to transmit/receive packets whose data size matches the MTU, although this is not absolutely necessary. Devices may transmit/receive packets whose data size differs from the MTU.

(9) In the above embodiments, devices are structure to transmit/receive packets whose DF bit is set to "on", although this is not absolutely necessary. Devices may transmit/receive packets whose DF bit is set to "off".

(10) In the above embodiments, devices acquire relay-device unique information that identifies a relay device to which the devices are connected, and transmit/receive packets that include the acquired relay-device unique information, although this is not absolutely necessary. Devices may transmit/receive packets that do not include relay-device unique information.

(11) In embodiment 2, device IDs of devices are registered in a group table, although the present invention is not limited to this structure. For example, an ID of a memory card or similar recording medium mounted for use in a terminal may be registered in a group table.

(12) Furthermore, the present invention may be a system LSI (large-scale integration) constituted from a core central processing unit (CPU) and a digital signal processor (DSP), and the system LSI may execute a content distribution computer program, being a DSP program.

(13) The present invention may be a method of the above. Moreover, the method may be a computer program realized by a computer, or a digital signal formed from the program.

Furthermore, the present invention may be a floppy disk, a hard disk, a CD-ROM, an MO, a DVD-ROM, a DVD-RAM, a BD (blu-ray disc), a semiconductor memory or similar computer-readable recording medium storing the program or the digital signal. Moreover, the present invention may be the program or digital signal recorded onto such a recording medium.

Also, the program or digital signal recorded onto such a recording medium may be transmitted via a network or the like, representative examples of which include a telecommunication circuit, a radio or cable communication circuit, and the Internet.

Furthermore, the present invention may be a computer system that includes a microprocessor and a memory, the memory storing the program and the microprocessor operating in compliance with the program.

Furthermore, the present invention may be put into effect by another independent computer system as a result of transferring the program or the digital signal to the other computer system, either recorded on the recording medium or via a network or the like.

(14) The present invention may be any combination of the above embodiments and variations.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A communication device for performing transmission and reception of a content with another communication device having a setting unit that sets a time-to-live of an IP packet for transmitting to a predetermined value, the communication device comprising:

a storage unit operable to store therein a common predetermined value that is common to the communication device and the other communication device;

an acquiring unit operable to acquire a time-to-live of an IP packet received from the other communication device;

a judging unit operable to judge whether the acquired time-to-live is less than or equal to the common predetermined value stored in the storage unit; and a communication unit operable to conduct content transmission/reception with the other communication device only when said judging unit has judged that the acquired time-to-live is less than or equal to the common predetermined value stored in the storage unit, and to not conduct content transmission/reception with the other communication device when said judging unit has judged that the acquired time-to-live is not less than or equal to the common predetermined value stored in the storage unit.

2. The communication device of claim 1, further comprising:

a key sharing unit operable to share key information with the other communication device.

3. The communication device of claim 2, further comprising:

an encryption unit operable, using the shared key information, to encrypt contents and decrypt encrypted contents, wherein the communication unit transmits/receives encrypted contents.

4. The communication device of claim 3, wherein the encryption unit performs encryption based on an Advanced Encryption Standard.

5. The communication device of claim 1, further comprising:

an invalidation information acquiring unit operable to acquire, via a network, invalidation information identifying an invalidated communication device; and a storage unit operable to store the invalidation information acquired by the invalidation information acquiring unit.

6. The communication device of claim 5, further comprising:

a comparison unit operable to compare the acquired invalidation information and the invalidation information stored by the storage unit; and an updating unit operable, when the acquired invalidation information and the invalidation information stored by the storage unit do not match, to replace the stored invalidation information with the acquired invalidation information.

7. A content distribution system for performing transmission and reception of a content with a first communication device and a second communication device, the first communication device including:

a setting unit operable to set a time-to-live of an IP packet for transmission to the second communication device to a predetermined value, and the second communication device including:

a storage unit operable to store therein a common predetermined value that is common to the first communication device and the second communication device;

an acquiring unit operable to acquire the time-to-live of the IP packet received from the first communication device;

a judging unit operable to judge whether the acquired time-to-live is less than or equal to the common predetermined value stored in the storage unit; and a communication unit operable to conduct content transmission/reception with the first communication apparatus only when said judging unit has judged that the acquired time-to-live is less than or equal to the common predetermined value stored in the storage unit, and to not conduct content transmission/reception with the first communication device when said judging unit has judged that the acquired time-to-live is not less than or equal to the common predetermined value stored in the storage unit.

8. A content distribution method for performing transmission and reception of a content with a first communication device and a second communication device, comprising:

in the first communication device setting a time-to-live of an IP packet for transmission to the second communication device to a predetermined value, and in the second communication device storing a common predetermined value that is common to the first communication device and the second communication device acquiring the time-to-live of the IP packet received from the first communication device;

judging whether the acquired time-to-live is less than or equal to the stored common predetermined value; and conducting content transmission/reception with the first communication device only when said judging judges that the acquired time-to-live is less than or equal to the stored common predetermined value, and not conducting content transmission/reception with the first communication device when said judging has judged that the acquired time-to-live is not less than or equal to the stored common predetermined value.

9. A computer-readable recording medium having recorded thereon a content distribution computer program having computer executable instructions for causing a first communication device to perform a method comprising setting a time-to-live of an IP packet for transmission to a second communication device to a predetermined value, and for causing the second communication device to perform a method comprising: storing a common predetermined value that is common to the first communication device and the second communication device; acquiring the time-to-live of the IP packet received from the first communication device; judging whether the acquired time-to-live is less than or equal to the stored common predetermined value; and conducting content transmission/reception with the first communication device only when said judging judges that the acquired time-to-live is less than or equal to the stored common predetermined value, and not conducting content transmission/reception with the first communication device when said judging has judged that the acquired time-to-live is not less than or equal to stored common predetermined value.

10. An LSI, comprising a computer-readable storage medium having a content distribution computer program stored thereon, for executing the content distribution computer program to cause a first communication device to perform a method comprising setting a time-to-live of an IP packet for transmission to the second communication device to a pre-stored comparison value, and to cause a second communication device to perform a method comprising: storing a common predetermined value that is common to the first communication device and the second communication device; acquiring the time-to-live of the IP packet received from the first communication device; judging whether the acquired time-to-live is less than or equal to the stored common predetermined value; and conducting content transmission/reception with the first communication device only when said judging judges that the acquired time-to-live is less than or equal to the stored common predetermined value, and not conducting content transmission/reception with the first communication device when said judging has judged that the acquired time-to-live is not less than or equal to the stored common predetermined value.

* * * * *